US012603870B2

(12) United States Patent
Wang et al.

(10) Patent No.: US 12,603,870 B2
(45) Date of Patent: Apr. 14, 2026

(54) SECURE COMMUNICATION IMPLEMENTATION METHOD WITH SOFTWARE AND HARDWARE COLLABORATIVE ENCRYPTION AND NETWORK DEVICE

(71) Applicant: HANGZHOU HIKVISION DIGITAL TECHNOLOGY CO., LTD., Hangzhou (CN)

(72) Inventors: Bin Wang, Hangzhou (CN); Dinglei Wang, Hangzhou (CN); Haibin Zhang, Hangzhou (CN); Jiadong Chen, Hangzhou (CN); Yinghui Xie, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/202,667

(22) Filed: May 8, 2025

(65) Prior Publication Data

US 2026/0089144 A1 Mar. 26, 2026

(30) Foreign Application Priority Data

Jun. 25, 2024 (CN) .......................... 202410832813.0

(51) Int. Cl.
H04L 9/40 (2022.01)
H04L 9/06 (2006.01)
(52) U.S. Cl.
CPC ............ H04L 63/0485 (2013.01); H04L 9/06 (2013.01); H04L 63/123 (2013.01); H04L 2212/00 (2013.01)
(58) Field of Classification Search
CPC ...... H04L 63/0485; H04L 9/06; H04L 63/123
See application file for complete search history.

(56) References Cited

U.S. PATENT DOCUMENTS 10,594,472 B2 * 3/2020 Ding ........................ H04L 9/008
10,601,817 B2 * 3/2020 Lee ..................... H04L 63/0853
(Continued)

FOREIGN PATENT DOCUMENTS

CN 102065021 A 5/2011
CN 103457952 A 12/2013
(Continued)

OTHER PUBLICATIONS

Notice of Allowance in Chinese Appln. No. 202410832813.0, mailed on Aug. 22, 2024, 8 pages (with English translation).
(Continued)

*Primary Examiner* — Iral S Lakhia
(74) *Attorney, Agent, or Firm* — Fish & Richardson P.C.

(57) ABSTRACT

The present disclosure provides a secure communication implementation method with software and hardware collaborative encryption. The method includes: after receiving a first network packet, querying, by an extended framework for routing and management (XFRM) module, a first mapping table through message identification information of the first network packet to obtain SA information corresponding to the message identification information; encapsulating the SA information in the first network packet and sending an encapsulated first network packet to a programmable logic (PL) hardware module; after receiving the encapsulated first network packet, parsing, by the PL hardware module, the SA information from the encapsulated first network packet, performing Internet protocol security (IPSec) protection on the first network packet based on the SA information to obtain a secured first network packet.

9 Claims, 11 Drawing Sheets

(56) References Cited

U.S. PATENT DOCUMENTS

| | | | | |
|---|---|---|---|---|
| 10,701,102 B2 * | 6/2020 | Zeng | ..................... | H04L 63/062 |
| 10,999,260 B1 * | 5/2021 | Silvestri | ................ | H04L 9/0894 |
| 12,238,204 B1 * | 2/2025 | Delaney | .................. | H04L 61/10 |
| 2003/0169877 A1 | 9/2003 | Liu et al. | | |
| 2011/0271096 A1 | 11/2011 | Bharrat et al. | | |
| 2019/0020637 A1 | 1/2019 | Andersen et al. | | |
| 2025/0167993 A1 * | 5/2025 | Bhandaru | ............. | H04L 9/0631 |
| 2025/0330304 A1 * | 10/2025 | Wang | ................... | H04L 9/0819 |

FOREIGN PATENT DOCUMENTS

| | | | |
|---|---|---|---|
| CN | 106790221 A | 5/2017 | |
| CN | 109639513 A | 4/2019 | |
| CN | 114553602 A | 5/2022 | |
| CN | 118381684 B | 9/2024 | |
| EP | 4030722 A1 | 7/2022 | |

OTHER PUBLICATIONS

Office Action in Chinese Appln. No. 202410832813.0, mailed on Jul. 29, 2024, 17 pages (with English machine translation).

* cited by examiner

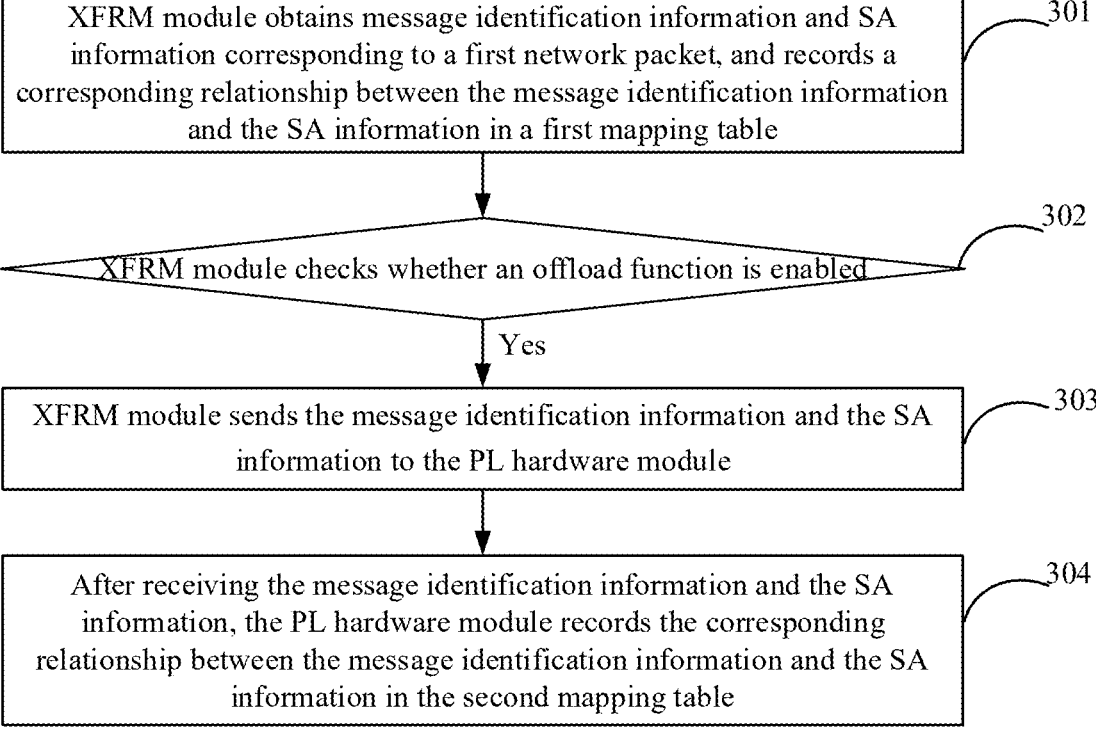

| XFRM module obtains message identification information and SA information corresponding to a first network packet, and records a corresponding relationship between the message identification information and the SA information in a first mapping table | 301 |

XFRM module checks whether an offload function is enabled — 302

Yes

| XFRM module sends the message identification information and the SA information to the PL hardware module | 303 |

| After receiving the message identification information and the SA information, the PL hardware module records the corresponding relationship between the message identification information and the SA information in the second mapping table | 304 |

FIG. 3

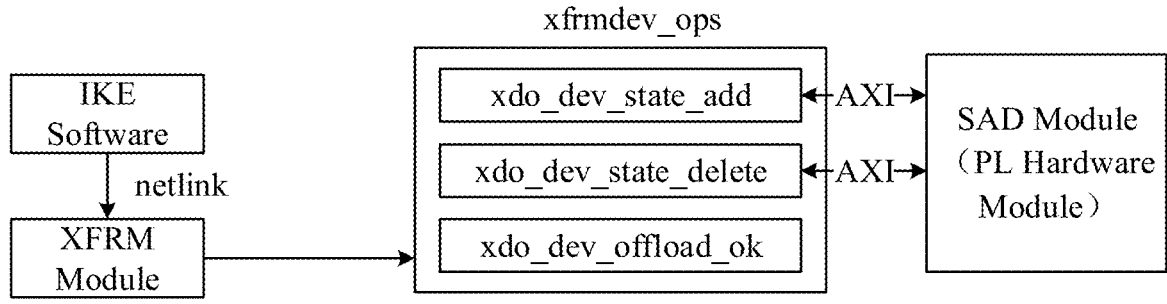

xfrmdev_ops

IKE Software netlink

XFRM Module xdo_dev_state_add xdo_dev_state_delete xdo_dev_offload_ok

AXI

AXI

SAD Module (PL Hardware Module)

FIG. 4A

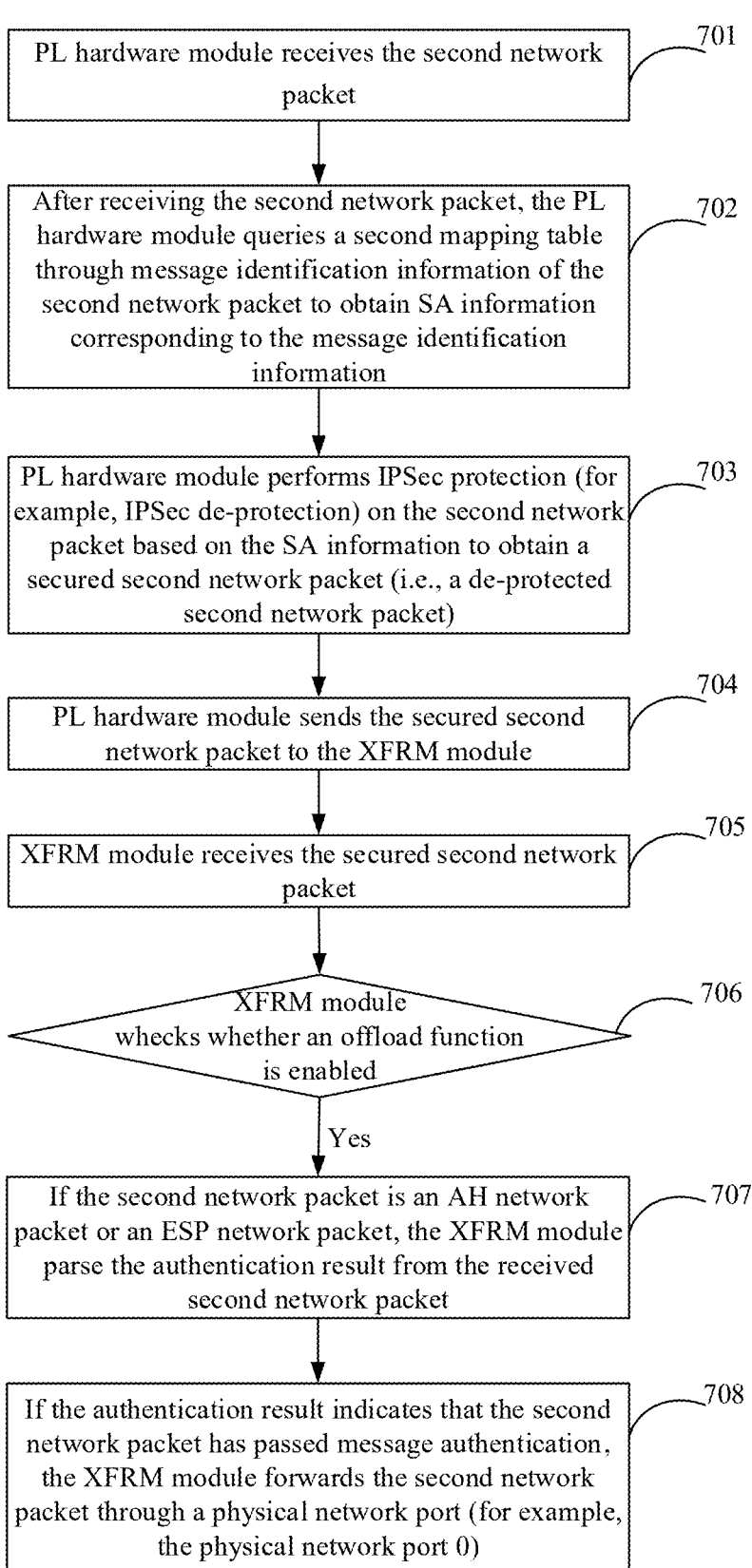

PL hardware module receives the second network packet ⟋701

After receiving the second network packet, the PL hardware module queries a second mapping table through message identification information of the second network packet to obtain SA information corresponding to the message identification information ⟋702

PL hardware module performs IPSec protection (for example, IPSec de-protection) on the second network packet based on the SA information to obtain a secured second network packet (i.e., a de-protected second network packet) ⟋703

PL hardware module sends the secured second network packet to the XFRM module ⟋704

XFRM module receives the secured second network packet ⟋705

XFRM module whecks whether an offload function is enabled ⟋706

Yes

If the second network packet is an AH network packet or an ESP network packet, the XFRM module parse the authentication result from the received second network packet ⟋707

If the authentication result indicates that the second network packet has passed message authentication, the XFRM module forwards the second network packet through a physical network port (for example, the physical network port 0) ⟋708

FIG. 7A

SECURE COMMUNICATION IMPLEMENTATION METHOD WITH SOFTWARE AND HARDWARE COLLABORATIVE ENCRYPTION AND NETWORK DEVICE

CROSS REFERENCE TO RELATED APPLICATIONS

This application claims priority to Chinese Patent Application No. 202410832813.0 entitled "SECURE COMMUNICATION IMPLEMENTATION METHOD WITH SOFTWARE AND HARDWARE COLLABORATIVE ENCRYPTION AND NETWORK DEVICE" filed on Jun. 25, 2024, the entire content of which is incorporated herein by reference.

TECHNICAL FIELD

The present disclosure relates to the field of communication technology, and in particular to a secure communication implementation method with software and hardware collaborative encryption and a network device.

BACKGROUND

Internet protocol security (IPSec) is a security architecture that uses cryptography to protect Internet protocol (IP) layer communication. IPSec is a protocol cluster, which is a network transmission protocol cluster (some interrelated protocol sets) that protects an IP protocol by encrypting and authenticating IP protocol packets. IPSec can realize the following four functions: data confidentiality, an IPSec sender encrypts a network packet before sending it; data integrity, an IPSec receiver verifies the network packet to ensure that the network packet is not altered during transmission; data authentication, the IPSec receiver identifies a sending origin of the network packet; anti-replay, the IPSec receiver checks and refuses to replay the network packet.

IPSec is mainly composed of the following protocols: an authentication header (AH), an encapsulating security payload (ESP), a security association (SA), and an Internet key exchange (IKE). The AH is an encapsulation mode of IPSec, which provides connectionless data integrity, message authentication, and anti-replay attack protection for a network packet. The ESP is an encapsulation mode of IPSec, which provides confidentiality, data source authentication, connectionless integrity, anti-replay, and traffic-flow confidentiality for the network packet. The SA provides algorithms and data packets, as well as parameters required for AH operations and ESP operations. The IKE is a communication protocol for establishing the SA, and is for survival and exchange of a symmetric key required for ESP/AH encapsulation.

In an IPSec processing procedure, it is necessary to use SA information to perform IPSec protection on the network packet. However, the process of the IPSec protection for the network packet needs to consume a large amount of processor resources, and occupies a high amount of resources.

SUMMARY

In view of this, the present disclosure proposes a secure communication implementation method with software and hardware collaborative encryption, which can reduce processor resources consumed in the process of Internet protocol security (IPSec) protection and save resource overhead.

The present disclosure provides a secure communication implementation method with software and hardware collaborative encryption, applied to a network device. The network device includes an extended framework for routing and management (XFRM) module and a programmable logic (PL) hardware module, and the method includes:

obtaining, by the XFRM module, message identification information and security association (SA) information corresponding to a first network packet, and recording a corresponding relationship between the message identification information and the SA information in a first mapping table;

after receiving the first network packet, querying, by the XFRM module, the first mapping table through the message identification information of the first network packet to obtain the SA information corresponding to the message identification information; and encapsulating the SA information in the first network packet and sending an encapsulated first network packet to the PL hardware module;

after receiving the encapsulated first network packet, parsing, by the PL hardware module, the SA information from the encapsulated first network packet, performing IPSec protection on the first network packet based on the SA information to obtain a secured first network packet, and sending the secured first network packet.

The present disclosure provides a network device, including:

an extended framework for routing and management (XFRM) module, configured to: obtain message identification information and security association (SA) information corresponding to a first network packet, and record a corresponding relationship between the message identification information and the SA information in a first mapping table; and after receiving the first network packet, query the first mapping table through the message identification information of the first network packet to obtain the SA information corresponding to the message identification information, and encapsulate the SA information in the first network packet and send an encapsulated first network packet to a programmable logic (PL) hardware module; and the PL hardware module, configured to: after receiving the encapsulated first network packet, parse the SA information from the encapsulated first network packet, perform IPSec protection on the first network packet based on the SA information to obtain a secured first network packet, and send the secured first network packet.

From the above technical solution, it can be seen that in the embodiment of the present disclosure, the IPSec processing procedure is implemented through collaboration of software and hardware, that is, the XFRM module is implemented through software, and the PL hardware module is implemented through hardware. The operations that consume a large amount of resources (the IPSec protection is performed on the network packets based on the SA information) in the IPSec processing procedure are placed in the PL hardware module to complete, and the remaining operations are placed in the XFRM module to complete, thereby reducing processor resources consumed in the process of the IPSec protection (XFRM module uses processor resources), saving resource overhead, and utilizing high-performance calculation of the PL hardware module to reduce the load of the processor resources.

BRIEF DESCRIPTION OF THE DRAWINGS

FIG. 3 is a schematic diagram of an extended framework for routing and management (XFRM) module and a programmable logic (PL) hardware module maintaining mapping tables synchronously according to an example of the present disclosure.

FIG. 4A is a schematic diagram of a processing procedure of an XFRM module according to an example of the present disclosure.

FIG. 7A is a schematic diagram of an IPSec processing procedure for a second network packet according to an example of the present disclosure.

DETAILED DESCRIPTION OF THE EMBODIMENTS

Figure 1:
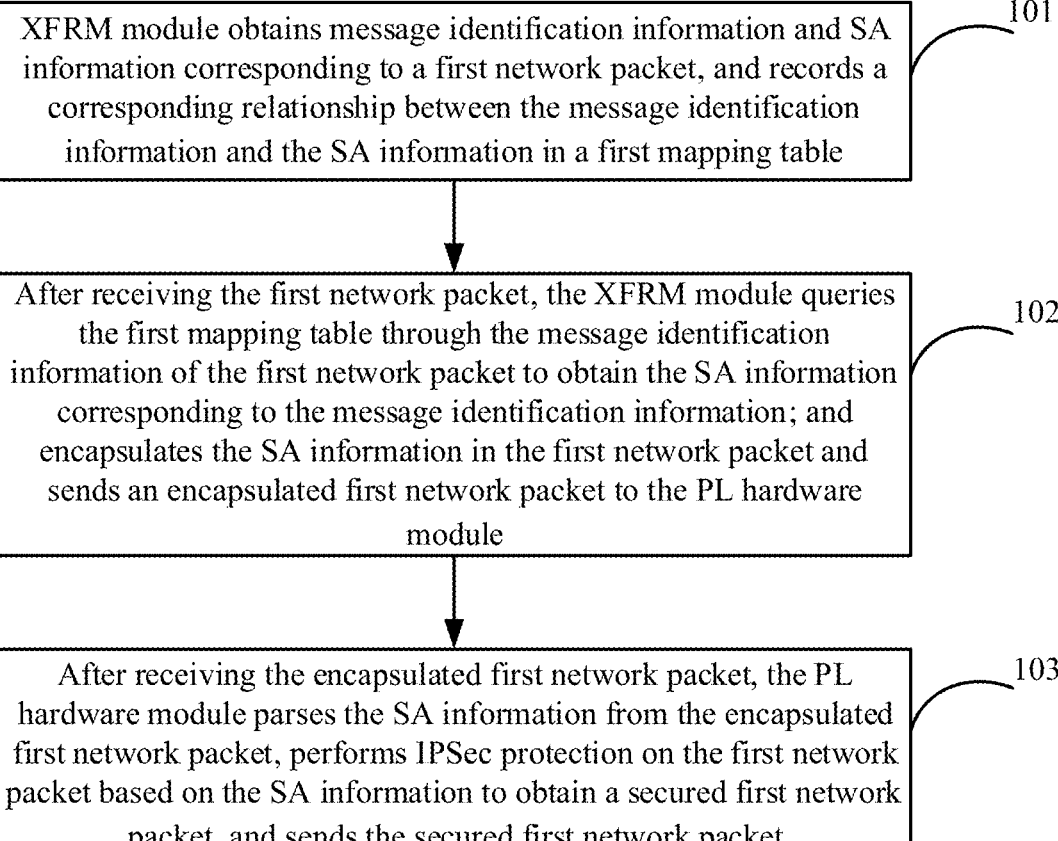
FIG. 1 is a flowchart of a secure communication implementation method with software and hardware collaborative encryption according to an example of the present disclosure.

An embodiment of the present disclosure proposes a secure communication implementation method with software and hardware collaborative encryption, which can be applied to a network device. The network device can serve as an Internet protocol security (IPSec) sender or an IPSec receiver. The network device can include an extended framework for routing and management (XFRM) module and a programmable logic (PL) hardware module. The XFRM module can be implemented by software, and the PL hardware module can be implemented by hardware. FIG. 1 is a flowchart of a secure communication implementation method with software and hardware collaborative encryption according to an example of the present disclosure. As shown in FIG. 1, the method can include steps 101 to 103.

In step 101, the XFRM module obtains message identification information and security association (SA) information corresponding to a first network packet, and records a corresponding relationship between the message identification information and the SA information in a first mapping table.

In step 102, after receiving the first network packet, the XFRM module queries the first mapping table through the message identification information of the first network packet to obtain the SA information corresponding to the message identification information; and encapsulates the SA information in the first network packet and sends an encapsulated first network packet to the PL hardware module.

In step 103, after receiving the encapsulated first network packet, the PL hardware module parses the SA information from the encapsulated first network packet, performs IPSec protection on the first network packet based on the SA information to obtain a secured first network packet, and sends the secured first network packet.

In an example, after the XFRM module querying the first mapping table through the message identification information of the first network packet to obtain the SA information corresponding to the message identification information, the method can further include: the XFRM module checks whether an offload function is enabled; where if the offload function is enabled, it indicates that IPSec protection is disabled, if the offload function is disabled, it indicates that the IPSec protection is enabled. If the offload function is disabled, the XFRM module can perform the IPSec protection on the first network packet based on the SA information to obtain a secured first network packet, and send the secured first network packet. If the offload function is enabled, the XFRM module can perform the operations of encapsulating the SA information in the first network packet and sending the encapsulated first network packet to the PL hardware module.

In an example, the PL hardware module performs the IPSec protection on the first network packet based on the SA information to obtain the secured first network packet, which can include but is not limited to: the PL hardware module performs media access control (MAC) parsing on the first network packet to obtain a MAC address and a first inner layer message after the MAC address; the PL hardware module performs Internet protocol (IP) parsing on the first inner layer message to obtain an IP address and a second inner layer message after the IP address. If the first network packet is an authentication header (AH) network packet or an encapsulating security payload (ESP) network packet, the PL hardware module performs SA parsing on the second inner layer message to obtain the SA information and a payload message after the SA information. If the SA information includes symmetric key information and message authentication code key information, the PL hardware module encrypts the payload message with the symmetric key information to obtain a ciphertext payload message, and calculates a message authentication code corresponding to the ciphertext payload message with the message authentication code key information; and the PL hardware module splices the ciphertext payload message, the message authentication code, the MAC address, and the IP address to obtain the secured first network packet.

In an example, after the XFRM module obtaining the message identification information and the SA information corresponding to the first network packet, the method can further include: the XFRM module sends the message identification information and the SA information to the PL hardware module, where the PL hardware module records the corresponding relationship between the message identification information and the SA information in a second mapping table.

After the PL hardware module sending the secured first network packet, the method can further include: after receiving a second network packet in response to the first network packet, the PL hardware module queries the second mapping table through message identification information of the second network packet to obtain the SA information. The PL hardware module performs IPSec protection on the second network packet based on the SA information to obtain a secured second network packet, and sends the secured second network packet to the XFRM module so that the XFRM module processes the received second network packet.

In an example, the PL hardware module performing the IPSec protection on the second network packet based on the SA information to obtain the secured second network packet can include but is not limited to: the PL hardware module performs MAC parsing on the second network packet to obtain a MAC address and a first inner layer message after the MAC address; the PL hardware module performs IP parsing on the first inner layer message to obtain an IP address and a second inner layer message after the IP address. If the SA information includes symmetric key information and message authentication code key information, the PL hardware module can calculate a message authentication code corresponding to the second inner layer message with the message authentication code key information, and determine an authentication result of the second network packet based on the message authentication code; the PL hardware module decrypts the second inner layer message with the symmetric key information to obtain a plaintext payload message. The PL hardware module splices the plaintext payload message, the authentication result, the MAC address, and the IP address to obtain the secured second network packet.

In an example, the XFRM module processes the received second network packet, which can include but is not limited to: the XFRM module checks whether an offload function is enabled; if the offload function is enabled, and the second network packet is an AH network packet or an ESP network packet, the XFRM module can parse the authentication result from the received second network packet; where the authentication result can indicate that the second network packet passes message authentication or the second network packet does not pass the message authentication. If the authentication result indicates that the second network packet passes the message authentication, the XFRM module can forward the second network packet through a physical network port; or, if the authentication result indicates that the second network packet does not pass the message authentication, the XFRM module can discard the second network packet.

In an example, the XFRM module sends the message identification information and the SA information to the PL hardware module, where the PL hardware module records the corresponding relationship between the message identification information and the SA information in the second mapping table, which can include but is not limited to: if the SA information is newly added SA information for the message identification information, the XFRM module can send a state add command to the PL hardware module, where the state add command can carry the message identification information and the newly added SA information. The PL hardware module can record the corresponding relationship between the message identification information and the newly added SA information in the second mapping table based on the state add command. Or, if the SA information is updated SA information for the message identification information, the XFRM module can send a state delete command and a state add command to the PL hardware module, where the state delete command can carry the message identification information, and the state add command can carry the message identification information and the updated SA information. The PL hardware module deletes the corresponding relationship between the message identification information and the SA information from the second mapping table based on the state delete command, and records a corresponding relationship between the message identification information and newly added SA information in the second mapping table based on the state add command.

From the above technical solution, it can be seen that in the embodiment of the present disclosure, the IPSec processing procedure is implemented through collaboration of software and hardware, that is, the XFRM module is implemented through software, and the PL hardware module is implemented through hardware. The operations that consume a large amount of resources (the IPSec protection is performed on the network packets based on the SA information) in the IPSec processing procedure are placed in the PL hardware module to complete, and the remaining operations are placed in the XFRM module to complete, thereby reducing processor resources consumed in the process of the IPSec protection (XFRM module uses processor resources), saving resource overhead, and utilizing high-performance calculation of the PL hardware module to reduce the load of the processor resources.

The above technical solution of the embodiment of the present disclosure will be described below in combination with specific application scenarios.

IPSec can realize the following four functions: data confidentiality, an IPSec sender encrypts a network packet before sending it; data integrity, an IPSec receiver verifies the network packet to ensure that the network packet is not altered during transmission; data authentication, the IPSec receiver identifies a sending origin of the network packet; anti-replay, the IPSec receiver checks and refuses to replay the network packet. IPSec is mainly composed of the following protocols: an authentication header (AH), an encapsulating security payload (ESP), a security association (SA), and an Internet key exchange (IKE). The AH is an encapsulation mode of IPSec, which provides connectionless data integrity, message authentication, and anti-replay attack protection for a network packet. The ESP is an encapsulation mode of IPSec, which provides confidentiality, data source authentication, connectionless integrity, anti-replay, and traffic-flow confidentiality for the network packet. The SA provides algorithms and data packets, as well as parameters required for AH operations and ESP operations. The IKE is a communication protocol for establishing the SA, and is for survival and exchange of a symmetric key required for ESP/AH encapsulation.

In an IPSec processing procedure, it is necessary to use SA information to perform IPSec protection on network packets. However, the process of the IPSec protection for the network packets needs to consume a large amount of processor resources, and occupies a high amount of resources.

In view of the above findings, a secure communication implementation method with software and hardware collaborative encryption is proposed in an embodiment of the present disclosure. An XFRM module can be implemented through software, a PL hardware module can be implemented through hardware, and the IPSec processing procedure can be realized through software and hardware collaboration between the XFRM module and the PL hardware module.

Figure 2:
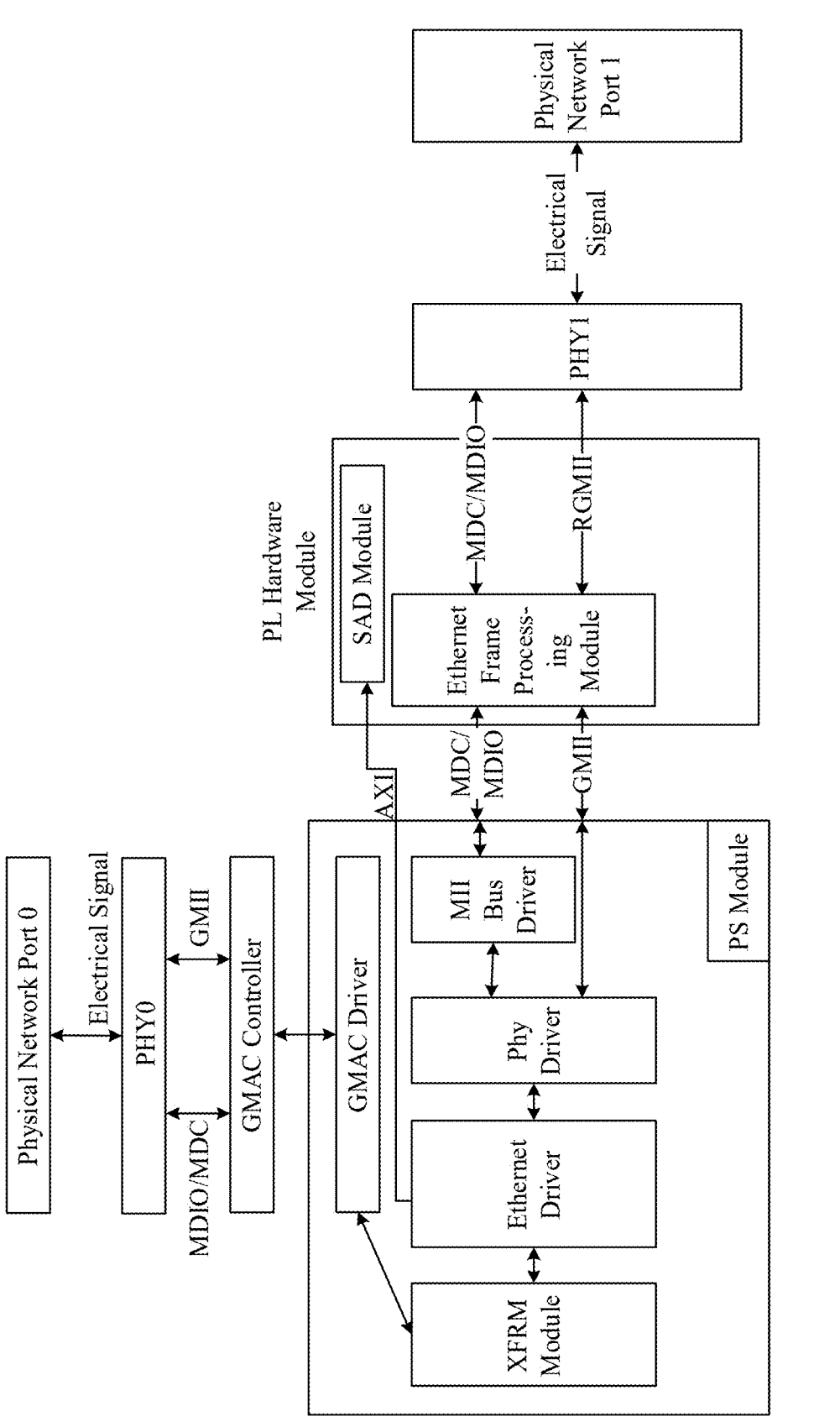
FIG. 2 is a schematic structural diagram of a network device according to an example of the present disclosure.

FIG. 2 is a schematic structural diagram of a network device according to an example of the present disclosure.

The network device is any type of device, for example, a routers and a switch. The network device can serve as an IPSec sender or an IPSec receiver. For example, it is assumed that a physical network port 0 of the network device is connected to a secure domain, and a physical network port 1 of the network device is connected to a non-secure domain. For a network packet (referred to as a first network packet) from the secure domain to the non-secure domain, the network device encrypts the first network packet and acts as the IPSec sender for the processing of the first network packet. For a network packet (referred to as a second network packet) from the non-secure domain to the secure domain, the network device decrypts the second network packet and acts as the IPSec receiver for the processing of the second network packet.

As shown in FIG. 2, the network device includes the physical network port 0, and the network device is connected to the secure domain through the physical network port 0. The network device includes a PHY0 (Physical), that is, a port physical layer 0. Electrical signals can be transmitted between the PHY0 and the physical network port 0. That is, data packets need to be converted into electrical signals for transmission. The network device includes a gigabit media access control (GMAC) controller. A signal between the GMAC controller and the PHY0 can be a management data input output (MDIO) signal/management data clock (MDC) signal. The signal between the GMAC controller and the PHY0 can be a gigabit media independent (GMII) signal.

As shown in FIG. 2, the network device may also include a processing system (PS) module and a programmable logic (PL) hardware module. The PS module and the PL hardware module can be implemented through the same device, or they can be implemented through different devices.

The PS module can include a GMAC driver, which is connected to the GMAC controller. A Network packet can be transmitted between the GMAC driver and the GMAC controller.

The PS module can include the XFRM module, which is also referred to as an XFRM framework module. The XFRM module is an "infrastructure" of IPSec. This "infrastructure" is independent of a protocol cluster and includes a common part that can be applied to both Internet protocol version 4 (IPv4) and Internet protocol version 6 (IPv6). That is, the process of the IPSec protection can be implemented through the XFRM module. In this embodiment, functions of the XFRM module can be improved, and part of the functions of the XFRM module can be placed in the PL hardware module, so that processor resources consumed in the process of the IPSec protection can be reduced.

The XFRM module can be implemented through software. That is, the XFRM module can call processor resources to implement the process of the IPSec protection. The XFRM module is connected to the GMAC driver. The XFRM module can receive a network packet from the GMAC driver, and can also send a network packet to the GMAC driver.

The PS module can include an Ethernet driver, which can also be an Ethernet MAC driver. The Ethernet driver is connected to a security association database (SAD) module of the PL hardware module through an advanced extensible interface (AXI), so that the XFRM module can communicate with the PL hardware module (for example, the SAD module) through the AXI. This process can be seen in the subsequent embodiments.

The PS module can include a physical layer driver (Phy driver) and a medium independent interface (MII) bus driver (common driver). A signal between the Phy driver and an Ethernet frame processing module of the PL hardware module can be a GMII signal. A signal between the MII bus driver and the Ethernet frame processing module of the PL hardware module can be a MDIO/MDC signal. Obviously, a GMII signal can be transmitted between the XFRM module and the PL hardware module (for example, the Ethernet frame processing module) (i.e., via the Ethernet driver and the Phy driver in turn), or a MDIO/MDC signal can be transmitted between the XFRM module and the Ethernet frame processing module (i.e., via the Ethernet driver, the Phy driver and the MII bus driver in turn for communication).

As shown in FIG. 2, the PL hardware module can include a SAD module and an Ethernet frame processing module. A signal between the SAD module and the XFRM module is an AXI signal, a signal between the Ethernet frame processing module and the XFRM module is a GMII signal, or a signal between the Ethernet frame processing module and the XFRM module is a MDIO/MDC signal.

The PL hardware module can be implemented through hardware. That is, additional hardware can be configured on the network device to implement the PL hardware module. The PL hardware module can be configured on any programmable logic device, which is not limited.

As shown in FIG. 2, the network device includes the physical network port 1, and the network device is connected to the non-secure domain through the physical network port 1. The network device includes a PHY1, that is, a port physical layer 1. Electrical signals can be transmitted between the PHY1 and the physical network port 1. That is, data packets need to be converted into electrical signals for transmission. A signal between the Ethernet frame processing module of the PL hardware module and the PHY1 can be a MDIO/MDC signal. A signal between the Ethernet frame processing module of the PL hardware module and the PHY1 can also be a reduced gigabit media independent interface (RGMII) signal.

As can be seen from FIG. 2, when the PL hardware module is viewed as a whole, the IO of the PL hardware module includes the MDC/MDIO, the AXI, and the RGMII/GMII. The electrical signals in the physical network port 0 are converted into digital signals by the PHY0, and the PS module controls the PHY0 through the GMAC driver to complete communication of the physical network port 0. The electrical signals in the physical network port 1 are converted into digital signals by the PHY1 and transmitted to the PL hardware module. The PL hardware module parses and re-encapsulates Ethernet frames, serving as an intermediate transfer layer between the PS module and the PHY1.

From FIG. 2, it can be seen that the network port of the PL hardware module can be used as a computing offload network port (some functions of the XFRM module can be migrated to the PL hardware module for implementation), and the PL hardware module and PS module can be connected based on an Ethernet-PHY-MDIO/MII driver framework, so that the network port can be called normally by a Linux kernel. In this way, the process of network packet protection is also shortened, and the entire process can be completed through only the network port of the PL hardware module→PS processing→the network port of the PL hardware module, greatly reducing interface latency.

In the subsequent embodiments, processing procedures of the PL hardware module and the XFRM module will be described in detail. Processing procedures of other components of the network device are not limited in this embodiment.

In the above application scenario, the following processes may be involved in the embodiment of the disclosure.

Firstly, the XFRM module and the PL hardware module synchronously maintain mapping tables, which are used to record a corresponding relationship between message identification information and SA information. The message identification information can be identification information of a network packet, for example, address information of the network packet (such as a source IP address and a destination IP address). There is no limitation on the message identification information in the embodiments of the present disclosure.

The SA information is information used for IPSec protection on a network packet. The SA information can include symmetric key information and message authentication code key information. The symmetric key information can include a symmetric key and an encryption algorithm type. The encryption algorithm type represents an encryption algorithm used to encrypt the network packet, for example, an SM4 encryption algorithm, etc., and the symmetric key represents a key used when encrypting the network packet with this encryption algorithm. That is, when the network packet is encrypted with the SM4 encryption algorithm, the symmetric key is used to encrypt the network packet.

The message authentication code key information can include a message authentication code key and an integrity algorithm type. The integrity algorithm type represents which integrity algorithm is used to perform integrity processing on the network packet, for example, an SM3 algorithm, etc., and the message authentication code key represents a key used when processing the network packet with this integrity algorithm. That is, when the network packet is processed with the SM3 algorithm, the message authentication code key is used to process the network packet.

The above is only examples of the SA information, and the content of the SA information is not limited in the embodiment.

FIG. 3 is a schematic diagram of an XFRM module and a PL hardware module maintaining mapping tables synchronously according to an example of the present disclosure.

In step 301, the XFRM module obtains message identification information and SA information corresponding to a first network packet, and records a corresponding relationship between the message identification information and the SA information in a first mapping table.

In an example, the first network packet is a data packet from a physical network port 0 (secure domain) to a physical network port 1 (non-secure domain). After an IKE is created or renegotiated, an upper layer application can send an SA request to the XFRM module through a netlink. The SA request can carry the message identification information and the SA information corresponding to the first network packet.

After receiving the SA request, the XFRM module can parse the message identification information and the SA information from the SA request, and record the corresponding relationship between the message identification information and the SA information in the first mapping table.

In step 302, the XFRM module checks whether an offload function is enabled. If the offload function is enabled, it indicates that IPSec protection is disabled, that is, it is forbidden for the XFRM module to enable the IPSec protection. In this case, it is necessary to enable IPSec protection in the PL hardware module. If the offload function is disabled, it indicates that the IPSec protection is enabled, that is, the XFRM module enables the IPSec protection. In this case, there is no need to enable IPSec protection in the PL hardware module. That is, the PL hardware module does not need to participate in IPSec protection of the network packet.

If the offload function is disabled, the process ends and the XFRM module does not need to send the message identification information and the SA information to the PL hardware module. There is also no need to record the corresponding relationship between the message identification information and the SA information in a second mapping table of the PL hardware module. If the offload function is enabled, the XFRM module can perform step 303.

In step 303, the XFRM module sends the message identification information and the SA information to the PL hardware module.

In step 304, after receiving the message identification information and the SA information, the PL hardware module records the corresponding relationship between the message identification information and the SA information in the second mapping table.

In a possible implementation, as shown in FIG. 4A, which is a schematic diagram of a processing procedure of the XFRM module, the upper layer application can be IKE software. The IKE software can send the SA request to the XFRM module through the netlink. The SA request can carry the message identification information and the SA information. In addition, the XFRM module can support the xfrmdev_ops (device operation) function. The xfrmdev_ops function can include but is not limited to three sub-functions: xdo_dev_offload_ok, xdo_dev_state_add, and xdo_dev_state_delete.

Based on the xdo_dev_offload_ok sub-function, the XFRM module can check whether the offload function is enabled. If the offload function is enabled, the xdo_dev_state_add sub-function or the xdo_dev_state_delete sub-function is triggered.

If the SA information is newly added SA information for the message identification information, that is, the PL hardware module has not recorded the SA information corresponding to the message identification information, in this case, the SA information is newly added SA information, and the xdo_dev_state_add sub-function can be triggered. Based on the xdo_dev_state_add sub-function, the XFRM module sends a state add command (i.e., an xdo_dev_state_add command) to a SAD module of the PL hardware module. The state add command carries the message identification information and the newly added SA information. The state add command is an AXI-based command.

After receiving the state add command, the SAD module can parse the message identification information and the newly added SA information, and record the corresponding relationship between the message identification information and the newly added SA information in the second mapping table.

If the SA information is updated SA information for the message identification information, that is, the PL hardware module has already recorded the SA information corresponding to the message identification information, in this case, the SA information is updated SA information, and the xdo_dev_state_delete sub-function and the xdo_dev_state_add sub-function can be triggered simultaneously.

Based on the xdo_dev_state_delete sub-function, the XFRM module sends a state delete command (i.e., an xdo_dev_state_delete command) to the SAD module of the PL hardware module. The state delete command can carry the message identification information. The state delete command can be an AXI-based command. After receiving the state delete command, the SAD module can parse the message identification information and delete the corresponding relationship between the message identification information and the SA information from the second mapping table. That is, an existing entry of the message identification information is deleted.

Based on the xdo_dev_state_add sub-function, the XFRM module sends a state add command to the SAD module. The state add command carries the message identification information and the updated SA information. The state add command can be an AXI-based command. After receiving the state add command, the SAD module can parse the message identification information and the updated SA information, and record a corresponding relationship between the message identification information and the updated SA information in the second mapping table.

In a possible implementation, in order to protect the network packet, a driver framework of the PHY1 can be modified, and the SAD module of the PL hardware module can be modified by the AXI, so that the XFRM module can support the sub-functions such as xdo_dev_offload_ok, xdo_dev_state_add and xdo_dev_state_delete.

Figure 4B:
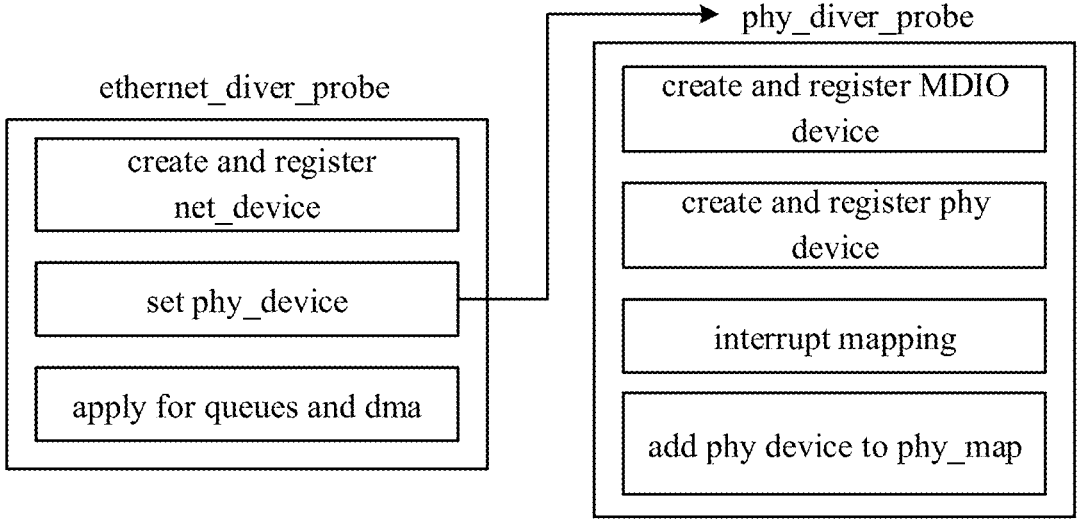
FIG. 4B is a schematic diagram of a driver framework of a PHY1 according to an example of the present disclosure.

FIG. 4B is a schematic diagram of a driver framework of a PHY1 according to an example of the present disclosure. As shown in FIG. 4B, the driver framework of the PHY1 can include an ethernet_diver_probe and a phy_diver_probe. In a process of the ethernet_diver_probe, the following functions can be implemented: creating and registering a net_device, setting a phy_device, and applying for queues and direct memory access (dma).

In a process of the phy_diver_probe, the following functions can be implemented: creating and registering a MDIO device, creating and registering a phy device, interrupting mapping, and adding a phy device to a phy_map.

Figure 4C:
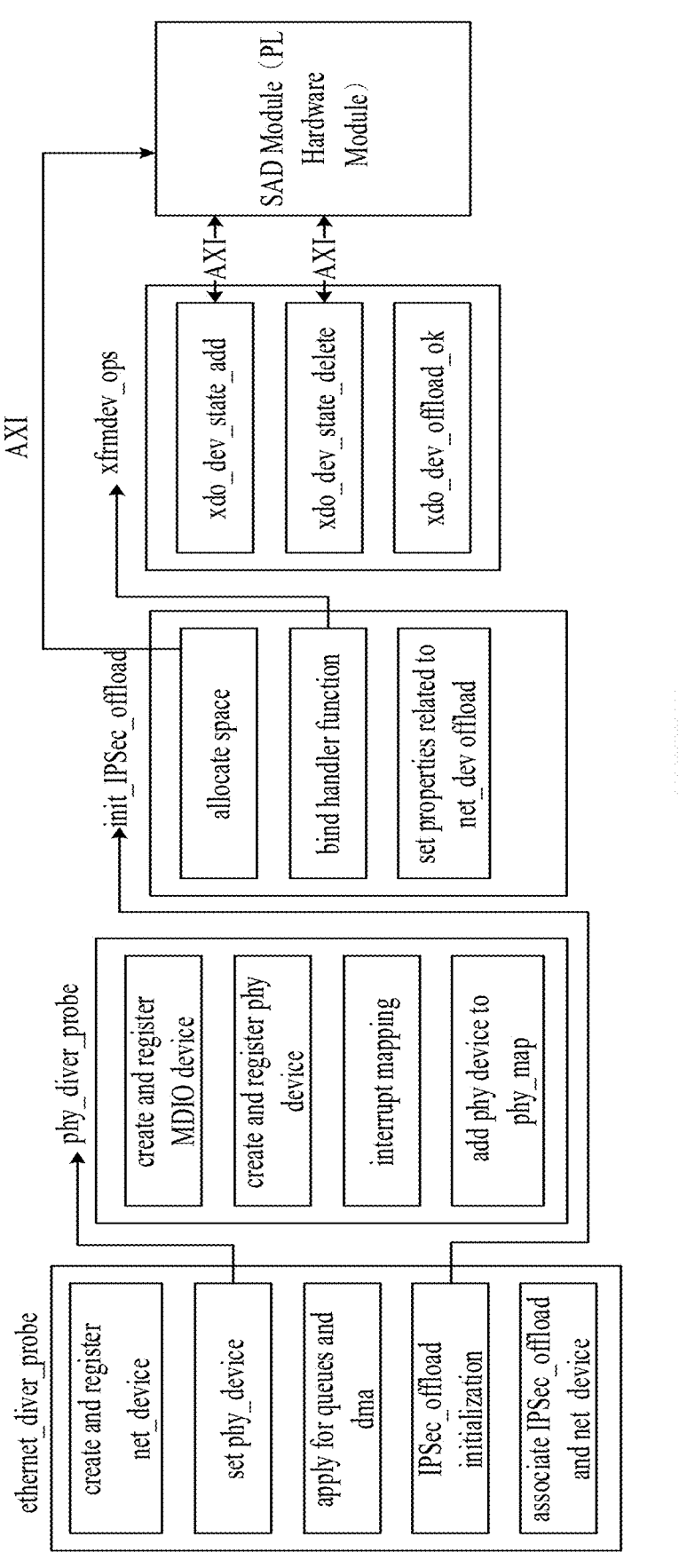
FIG. 4C is a schematic diagram of an improved driver framework of a PHY1 according to an example of the present disclosure.

After improving the driver framework of the PHY1, as shown in FIG. 4C, which is a schematic diagram of an improved driver framework of a PHY1 according to an example of the present disclosure, the improved driver framework of the PHY1 can include an ethernet_diver_probe, a phy_diver_probe, an init_IPSec_offload (initialization of the offload function of IPSec).

In the process of the ethernet_diver_probe, in addition to creating and registering a net_device, setting a phy_device, applying for queues and dma, the ethernet_diver_probe can also implement the following functions: IPSec_offload initialization, associating IPSec_offload and a net_device. The IPSec_offload initialization function can correspond to init_IPSec_offload. For associating IPSec_offload and net_device, IPSec-related members of the net_device can be set to associate the IPSec_offload and the IPSec-related members of the net_device.

In the process of the phy_diver_probe, functions such as creating and registering a MDIO device, creating and registering a phy device, interrupting mapping and adding a phy device to a phy_map can still be involved.

In a process of the init_IPSec_offload, a Linux SA database can be created, and space can be allocated for the Linux SA database (that is, the mapping table is maintained through the space, and the corresponding relationship between the message identification information and the SA information is recorded in the mapping table). A request can be sent to the SAD module through the AXI. This request is used to clear all data in the SAD module. In this way, so that the SAD module can also maintain the mapping table.

In the process of the init_IPSec_offload, a handler function can be bound, through which methods related to xfrmdev_ops can be added and bound. That is, the handler function enables the XFRM module to implement the xfrmdev_ops function. The xfrmdev_ops function can include two sub-functions such as xdo_dev_state_add and xdo_dev_state_delete. The implementation of these two sub-functions can be seen in the above embodiments. Two IPSec processing procedures, IPSec_rx/IPSec_tx, can also be added to a data receiving function and a data sending functions of an Ethernet layer to facilitate addition and reception of special data fields required by the PL hardware module for IPSec processing.

In the process of the init_IPSec_offload, properties related to net_dev offload can be set. By setting the properties related to net_dev offload, the XFRM module can implement the xfrmdev_ops function. The xfrmdev_ops function can include sub-functions such as xdo_dev_offload_ok. The implementation of the sub-functions can be seen in the above embodiments.

From the above, it can be seen that by improving the driver framework of the PHY1, the XFRM module can implement the xfrmdev_ops function, which can include xdo_dev_offload_ok, xdo_dev_state_add and xdo_dev_state_delete. The xfrmdev_ops includes processes such as adding SA information and deleting SA information. In the xdo_dev_state_add, a SA add request is sent to the SAD module by using the AXI interface. In the xdo_dev_state_delete, a SA delete request is sent to the SAD module by using the AXI interface. In the xdo_dev_offload_ok, it is mainly detected whether the current SA can be offloaded.

Secondly, for an IPSec processing procedure of the first network packet (i.e., a protection process of the first network packet), the first network packet is a data packet from a physical network port 0 (secure domain) to a physical network port 1 (non-secure domain).

Figure 5A:
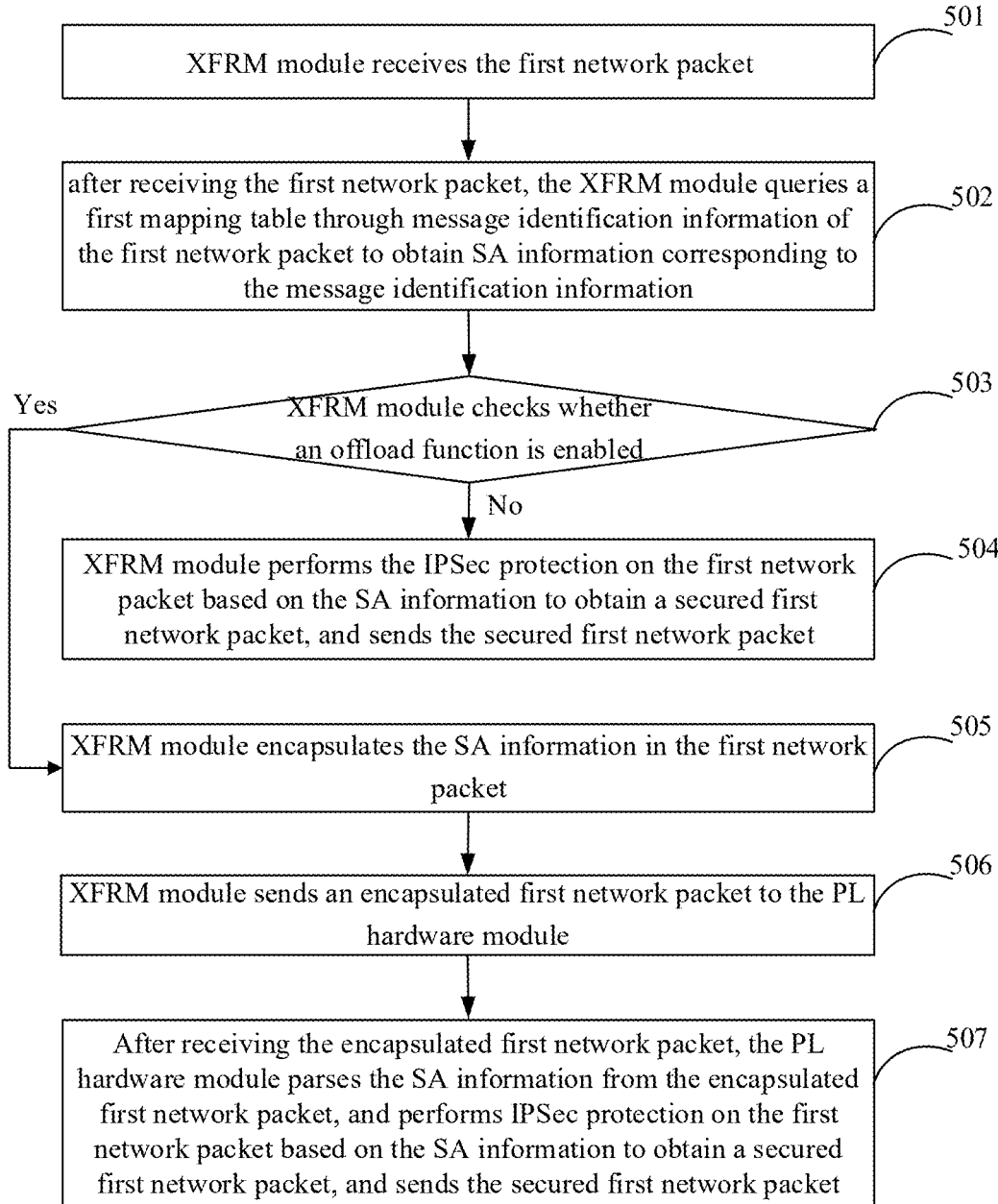
FIG. 5A is a schematic diagram of an IPSec processing procedure for a first network packet according to an example of the present disclosure.

FIG. 5A is a schematic diagram of an IPSec processing procedure for a first network packet according to an example of the present disclosure. As shown in FIG. 5A, the IPSec processing procedure includes steps 501 to 507.

In step 501, the XFRM module receives the first network packet.

In step 502, after receiving the first network packet, the XFRM module queries a first mapping table through message identification information of the first network packet to obtain SA information corresponding to the message identification information.

In step 502, the XFRM module checks whether an offload function is enabled.

In an example, if the offload function is disabled, it indicates that IPSec protection is enabled, that is, the XFRM module enables the IPSec protection. In this case, there is no need to enable IPSec protection in the PL hardware module. That is, the PL hardware module does not need to participate in IPSec protection of the network packet. Based on this, if the offload function is not turned on (i.e., the offload function is disabled), step 504 can be executed. If the offload function is enabled, it indicates that IPSec protection is disabled, that is, it is forbidden for the XFRM module to enable the IPSec protection. In this case, it is necessary to enable IPSec protection in the PL hardware module. Based on this, if the offload function is enabled, step 505 can be executed.

For example, if the offload function is disabled, it indicates that computation is not offloaded, and the IPSec protection can be performed by the XFRM module instead of the PL hardware module. If the offload function is enabled, it indicates the computation is offloaded. The IPSec protection is not performed by the XFRM module, but by the PL hardware module.

In step 504, the XFRM module performs the IPSec protection on the first network packet based on the SA information to obtain a secured first network packet, and sends the secured first network packet.

In an example, if the SA information includes symmetric key information and message authentication code key information, the XFRM module can encrypt the first network packet with the symmetric key information to obtain an encrypted network packet, calculate a message authentication code corresponding to the encrypted network packet with the message authentication code key information, and encapsulate the message authentication code in the encrypted network packet to obtain the secured first network packet. There is no limitation on this process in the present disclosure. The XFRM module can send the secured first network packet to external devices through the physical network port 1. Obviously, in the above process, there is no need for the PL hardware module to perform the IPSec protection on the first network packet.

Figure 5B:
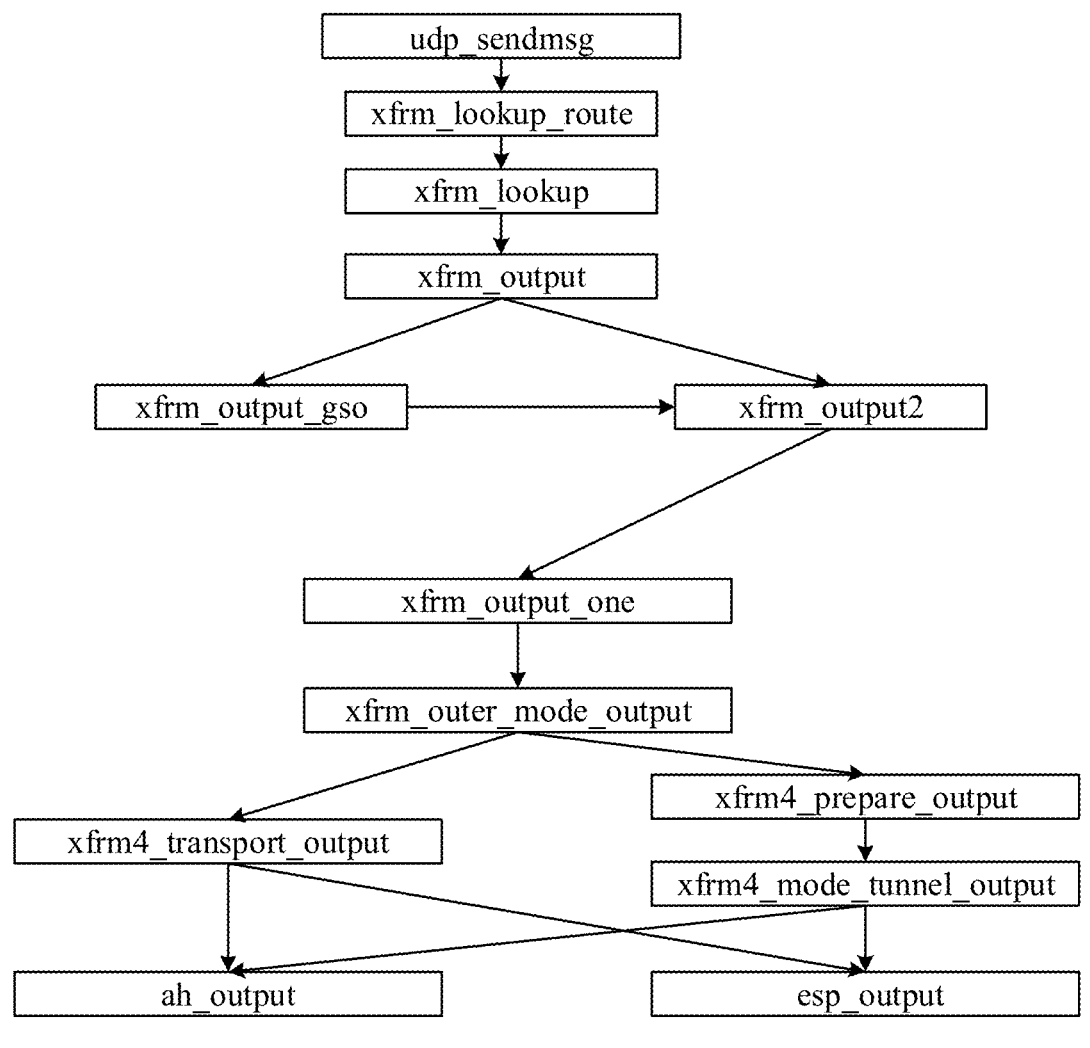
FIG. 5B is a schematic diagram of a processing procedure of an XFRM module according to an example of the present disclosure.

In a possible implementation, a processing procedure of the XFRM module can be shown in FIG. 5B.

For the first network packet received from the physical network port 0, since a destination IP address of the first network packet is not local, after IPv4 or IPv6 forwarding is enabled, the first network packet will be forwarded from other network ports (for example, the physical network port 1) and a sending process is entered, which corresponds to udp_sendmsg in FIG. 5B.

The XFRM module can query the first mapping table through the message identification information of the first network packet to obtain SA information. This process corresponds to xfrm_lookup_route and xfrm_lookup in FIG. 5B. The xfrm_lookup_route represents querying the first mapping table through the message identification information, and the xfrm_lookup represents obtaining SA information.

The protection process of the first network packet is entered, based on xfrm_output and xfrm_output2, it indicates entering the protection process for the first network packet. Based on xfrm_output, xfrm_output_gso, and xfrm_output2, it indicates first fragmenting the first network packet, and then entering the protection process for each fragmented network packet.

Figure 5C:
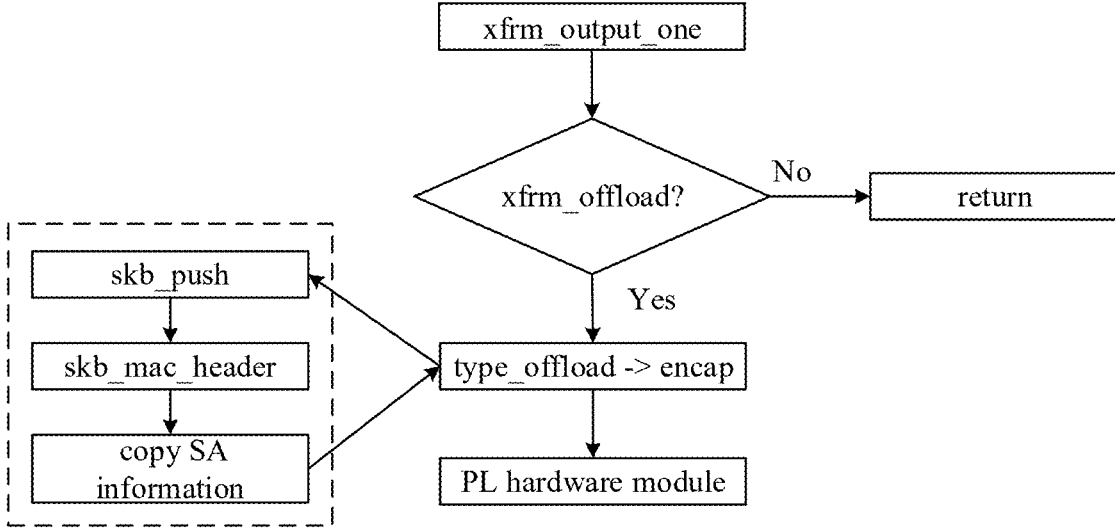
FIG. 5C is a schematic diagram of an xfrm_output_one process according to an example of the present disclosure.

Then, the xfrm_output_one process is entered, as shown in FIG. 5C, which is a schematic diagram of an xfrm_output_one process according to an example of the present disclosure. In the xfrm_output_one process, the XFRM module needs to check whether the offload function is enabled. If not, it can return to an xfrm_outer_mode_output process in FIG. 5B.

In the xfrm_outer_mode_output process, the XFRM module needs to determine an output mode of the first network packet. The output mode can be a transport mode or a tunnel mode. If the output mode of the first network packet is the transport mode, a forwarding process of the transport mode (corresponding to xfrm4_transport_output) can be executed. The IPSec protection can be performed on the first network packet based on the SA information to obtain the secured first network packet. If the first network packet is an AH network packet, the AH network packet (corresponding to ah_output) is sent. If the first network packet is an ESP network packet, the ESP network packet (corresponding to esp_output) is sent.

If the output mode of the first network packet is the tunnel mode, tunnel information (used to encapsulate a tunnel header for the first network packet, corresponding to xfrm4_prepare_output) can be obtained, and then a forwarding process of the tunnel mode (corresponding to xfrm4_mode_tunnel_output) can be executed. The IPSec protection can be performed on the first network packet based on the SA information, and the tunnel information can be encapsulated for the first network packet to obtain the secured first network packet. If the first network packet is an AH network packet, the AH network packet (corresponding to ah_output) is sent. If the first network packet is an ESP network packet, the ESP network packet (corresponding to esp_output) is sent.

In step 505, the XFRM module encapsulates the SA information in the first network packet.

In step 506, the XFRM module sends an encapsulated first network packet to the PL hardware module.

In an example, for the first network packet received from the physical network port 0, the first network packet will go through processes such as udp_sendmsg, xfrm_lookup_route, xfrm_lookup, xfrm_output, xfrm_output_gso, xfrm_output2, and then the xfrm_output_one process is entered. In the xfrm_output_one process, the XFRM module needs to check whether the offload function is enabled. If so, continue to refer to FIG. 5C and a type_offload→encap process is entered. In the type_offload→encap process, the XFRM module needs to encapsulate the SA information in the first network packet to obtain the encapsulated first network packet.

As shown in FIG. 5C, when encapsulating the SA information in the first network packet, a skb_push( ) method can be called to expand skb→data after an ESP/AH header (i.e., skb_mac_header) of the first network packet, and the SA information can be added to the skb→data. The SA information includes the symmetric key information and the message authentication code key information.

After obtaining the encapsulated first network packet, the XFRM module also needs to send the encapsulated first network packet to the PL hardware module. For example, after processes such as Linux net core_dev_queue_xmit→validate_xmit_xfrm→esp_xmit, the encapsulated first network packet can be processed by an Ethernet driver function IPSec_tx and then sent to PL hardware module by the XFRM module. There is no limitation on the sending process in the present disclosure.

In an example, in the xfrm_output_one process, the XFRM module can perform expiration check and replay number setting before checking whether the offload function is enabled. For example, the expiration check refers to checking whether the first network packet is expired. If so, the first network packet is discarded and the subsequent process is not executed. If not, if the offload function is enabled is checked. The replay number setting refers to setting a replay number for the first network packet.

In step 507, after receiving the encapsulated first network packet, the PL hardware module parses the SA information from the encapsulated first network packet, and performs IPSec protection on the first network packet based on the SA information to obtain a secured first network packet, and sends the secured first network packet.

For example, the PL hardware module can perform the IPSec protection on the first network packet based on the SA information, and send the first network packet out through the physical network port 1 to complete the protection of the first network packet.

Figure 6:
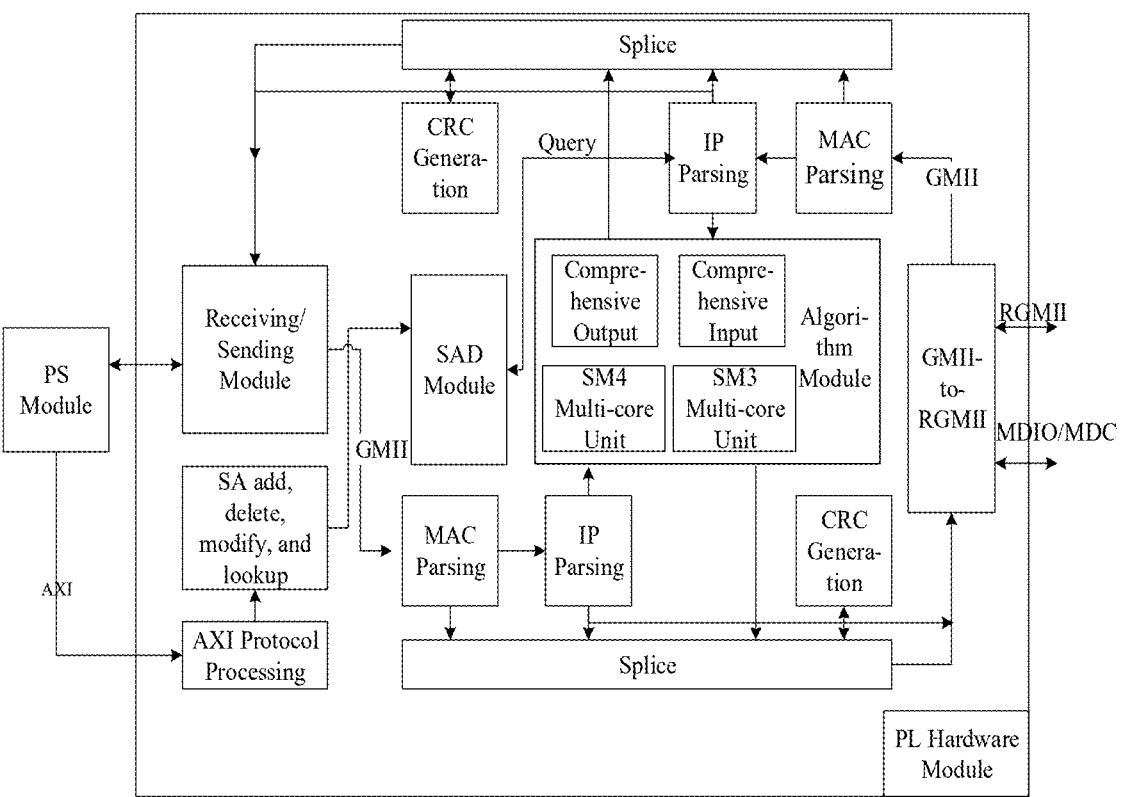
FIG. 6 is a schematic structural diagram of a PL hardware module according to an example of the present disclosure.

In a possible implementation, as shown in FIG. 6, which is a schematic structural diagram of a PL hardware module according to an example of the present disclosure, the PS module (for example, the XFRM module) can send an AXI message to the PL hardware module, for example, the state delete command and the state add command mentioned above. The PL hardware module performs AXI protocol processing on the AXI message, and parses contents such as the message identification information and the SA information. The operations such SA add, delete, modify, and lookup are performed on the second mapping table of the SAD module based on the message identification information and the SA information. This process can be referred to the above embodiments and will not be repeated here.

Except the AXI protocol processing, SA add, delete, modify and lookup, and the SAD module, the remaining part of the PL hardware module belongs to a functional part of an Ethernet frame processing module. For example, a receiving/sending module of the Ethernet frame processing module can receive the encapsulated first network packet from the PS module (for example, the XFRM module). The receiving/sending module can send the encapsulated first network packet to a MAC parsing module based on a GMII interface.

The MAC parsing module can perform MAC parsing on the encapsulated first network packet to obtain a MAC address (a MAC header) and a first inner layer message after the MAC address (the content after the MAC address is referred to as the first inner layer message), send the first inner layer message to an IP parsing module, and send the MAC address to a splicing module. After performing the MAC parsing on the first network packet, the MAC parsing module can also check a cyclic redundancy check (CRC) value (for example, a CRC32 value). If the check is successful, the first inner layer message is sent to the IP parsing module, and the MAC address is sent to the splicing module. If the check fails, the first network packet is discarded.

The IP parsing module can perform IP parsing on the first inner layer message to obtain an IP address (an IP header) and a second inner layer message after the IP address (the content after the IP address can be referred to as the second inner layer message), send the second inner layer message to an algorithm module, and send the IP address to the splicing module. The IP parsing module can also determine whether the first network packet is an AH network packet or an ESP network packet. If the first network packet is an AH network packet or an ESP network packet, the second inner layer message is sent to the algorithm module. Otherwise, if the first network packet is not an AH network packet and not an ESP network packet, the second inner layer message will not pass through the algorithm module.

A comprehensive input of the algorithm module is the second inner layer message. The algorithm module can perform SA parsing on the second inner layer message to obtain SA information and a payload message after the SA information. For example, the SA information can be located after the IP address and before payload data. Therefore, the front part of the second inner layer message is the SA information. The algorithm module can parse the SA information and the payload message after the SA information from the second inner layer message.

If the SA information includes symmetric key information, the algorithm module can encrypt the payload message by using the symmetric key information to obtain a ciphertext payload message. For example, the symmetric key information can include a symmetric key and an encryption algorithm type. Taking the encryption algorithm type being an SM4 encryption algorithm as an example, an SM4 multi-core unit of the algorithm module can use the SM4 encryption algorithm to encrypt the payload message. When using the SM4 encryption algorithm to encrypt the payload message, the SM4 multi-core unit can use the symmetric key to encrypt the payload message.

If the SA information includes message authentication code key information, the algorithm module can calculate a message authentication code corresponding to the ciphertext payload message with the message authentication code key information. For example, the message authentication code key information can include a message authentication code key and an integrity algorithm type. Taking the integrity algorithm type being an SM3 integrity algorithm as an example, an SM3 multi-core unit of the algorithm module can use the SM3 integrity algorithm to calculate the message authentication code corresponding to the ciphertext payload message. When using the SM3 integrity algorithm to calculate the message authentication code corresponding to the ciphertext payload message, the SM3 multi-core unit can use the message authentication code key to calculate the message authentication code.

A comprehensive output of the algorithm module can include the ciphertext payload messages and the message authentication code. Therefore, the algorithm module can output the ciphertext payload message and the message authentication code to the splicing module.

In summary, the splicing module can obtain the ciphertext payload message, the message authentication code, the MAC address, and the IP address. Therefore, the splicing module can splice the ciphertext payload message, the message authentication code, the MAC address, and the IP address to obtain the secured first network packet. For example, the MAC address is located before the IP address, the IP address is located before the ciphertext payload message, and the message authentication code is located after the ciphertext payload message.

In an example, a CRC generation module can also generate a CRC result corresponding to the first network packet, and the splicing module can obtain the CRC result from the CRC generation module and splice the ciphertext payload message, the message authentication code, the CRC result, the MAC address, and the IP address to obtain the secured first network packet.

After obtaining the secured first network packet, the splicing module sends the secured first network packet to a GMII-to-RGMII module, and the GMII-to-RGMII module sends the first network packet out.

At this point, the sending process of the first network packet is completed, and the first network packet is successfully protected and sent.

Thirdly, for an IPSec processing procedure of a second network packet (a de-protection process of the second network packet), the second network packet is a data packet from the physical network port 1 (non-secure domain) to the physical network port 0 (secure domain). The second network packet is a response to the first network packet. A source IP address of the second network packet is the destination IP address of the first network packet, and a destination IP address of the second network packet is the source IP address of the first network packet. SA information corresponding to message identification information of the second network packet is the same as the SA information corresponding to the message identification information of the first network packet.

FIG. 7A is a schematic diagram of an IPSec processing procedure for a second network packet according to an example of the present disclosure. As shown in FIG. 7A, the IPSec processing procedure includes steps 701 to 708.

In step 701, the PL hardware module receives the second network packet.

In step 702, after receiving the second network packet, the PL hardware module queries a second mapping table through message identification information of the second network packet to obtain SA information corresponding to the message identification information.

In an example, since the PL hardware module has already maintained the second mapping table, and the second mapping table maintained by the PL hardware module is the same as the first mapping table maintained by the XFRM module, after obtaining the SA information corresponding to the message identification information by the PL hardware module, the SA information in the de-protection process is the same as the SA information in the protection process.

For the de-protection process, the PL hardware module queries the SA information from the second mapping table. For the protection process, the PL hardware module parses the SA information from the first network packet, rather than querying the SA information from the second mapping table, thus saving the query process of the SA information and improving the processing efficiency of the network packet.

In step 703, the PL hardware module performs IPSec protection (for example, IPSec de-protection) on the second network packet based on the SA information to obtain a secured second network packet (i.e., a de-protected second network packet).

In step 704, the PL hardware module sends the secured second network packet to the XFRM module.

In a possible implementation, refer to FIG. 6, which is a schematic structural diagram of a PL hardware module according to an example of the present disclosure.

A PHY1 can receive an electrical signal from a physical network port 1 and convert the electrical signal into a RGMII temporal signal or a MDIO/MDC temporal signal. The GMII-to-RGMII module obtains a second network packet based on the RGMII temporal signal or the MDIO/MDC temporal signal, and sends the second network packet to a MAC parsing module.

The MAC parsing module can perform MAC parsing on the second network packet to obtain a MAC address (a MAC header) and a first inner layer message after the MAC address (the content after the MAC address is referred to as the first inner layer message), send the first inner layer message to an IP parsing module, and send the MAC address to a splicing module.

After performing the MAC parsing on the second network packet, the MAC parsing module can also check a CRC value (for example, a CRC32 value). If the check is successful, the first inner layer message is sent to the IP parsing module, and the MAC address is sent to the splicing module. If the check fails, the second network packet is discarded.

The IP parsing module can perform IP parsing on the first inner layer message to obtain an IP address (an IP header) and a second inner layer message after the IP address (the content after the IP address can be referred to as the second inner layer message), send the second inner layer message to an algorithm module, and send the IP address to the splicing module. The IP parsing module can also determine whether the second network packet is an AH network packet or an ESP network packet. If the second network packet is an AH network packet or an ESP network packet, the second inner layer message is sent to the algorithm module. Otherwise, if the second network packet is not an AH network packet and not an ESP network packet, the second inner layer message will not pass through the algorithm module.

After performing the IP parsing on the first inner layer message to obtain the IP address, the IP parsing module can also query the second mapping table in the SAD module through the message identification information (i.e., the IP address) of the second network packet to obtain the SA information corresponding to the message identification information, and send the SA information to the algorithm module.

A comprehensive input of the algorithm module is the second inner layer message (i.e., a payload message) and the SA information. If the SA information includes message authentication code key information, the algorithm module calculates a message authentication code corresponding to the second inner layer message with the message authentication code key information, and determines an authentication result of the second network packet based on the message authentication code.

For example, the message authentication code key information can include a message authentication code key and an integrity algorithm type. Taking the integrity algorithm type being an SM3 integrity algorithm as an example, an SM3 multi-core unit of the algorithm module can use the SM3 integrity algorithm to calculate a message authentication code A corresponding to the second inner layer message. When using the SM3 integrity algorithm to calculate the message authentication code A, the SM3 multi-core unit can use the message authentication code key to calculate the message authentication code A. If the message authentication code A is the same as a message authentication code B carried by the second network packet, the authentication result of the second network packet is that message authentication is passed. If the message authentication code A is different from the message authentication code B carried by the second network packet, the authentication result of the second network packet is that the message authentication is failed.

If the SA information includes symmetric key information, the algorithm module decrypts the second inner layer message (i.e., the ciphertext payload message) by using the symmetric key information to obtain a plaintext payload message. For example, the symmetric key information can include a symmetric key and an encryption algorithm type. Taking the encryption algorithm type being an SM4 encryption algorithm as an example, an SM4 multi-core unit of the algorithm module can use a decryption algorithm corresponding to the SM4 encryption algorithm to decrypt the second inner layer message. When decrypting, the SM4 multi-core unit can use the symmetric key for decryption.

A comprehensive output of the algorithm module can include the plaintext payload message and the authentication result of the second network packet. Therefore, the algorithm module can output the plaintext payload message and the authentication result to the splicing module.

In summary, the splicing module obtains the plaintext payload message, the authentication result, the MAC address, and the IP address. Therefore, the splicing module splices the plaintext payload message, the authentication result, the MAC address, and the IP address to obtain the secured second network packet. For example, the MAC address is located before the IP address, the IP address is located before the authentication result, and the authentication result is located before the plaintext payload message. The IP address can also be located before the plaintext payload message, and the authentication result can be located after the plaintext payload message.

In an example, a CRC generation module can also generate a CRC result corresponding to the second network packet, and the splicing module can obtain the CRC result from the CRC generation module, and splice the plaintext payload message, the authentication result, the CRC result, the MAC address, and the IP address to obtain the secured second network packet.

The splicing module can send the secured second network packet to a receiving/sending module, and the receiving/sending module can send the secured second network packet to the PS module (for example, the XFRM module).

At this point, the sending process of the second network packet is completed (i.e., the second network packet is sent from the PL hardware module to the XFRM module of the PS module), and the second network packet is successfully de-protected and sent.

In step 705, the XFRM module receives the secured second network packet.

In step 706, the XFRM module checks whether an offload function is enabled.

For example, if the offload function is disabled, it indicates that the XFRM module enables IPSec protection. That is, the XFRM module performs IPSec protection (for example, IPSec de-protection) on the second network packet based on the SA information, such as calculating the message authentication code by using the message authentication code key information, determining the authentication result of the second network packet based on the message authentication code, and performing decryption by using symmetric key information. This process will not be repeated here.

If the offload function is enabled, it indicates that the XFRM module does not enable IPSec protection. IPSec protection has already been enabled in the PL hardware module, and the XFRM module does not need to perform the IPSec protection on the second network packet after receiving the second network packet. Based on this, if the offload function is enabled, proceed to step 707.

For example, a CRYPTO_DONE flag of an xfrm_offload structure can be set to 1, indicating that the offloading function is enabled. If the CRYPTO_DONE flag is set to 0, it indicates that the offloading function is disabled.

In step 707, if the second network packet is an AH network packet or an ESP network packet, the XFRM module parse the authentication result from the received second network packet; where the authentication result can indicate that the second network packet passes message authentication or the second network packet does not pass the message authentication.

For example, since the second network packet can include the authentication result, for example, the authentication result is located before the plaintext payload message of the second network packet, or the authentication result is located after the plaintext payload message of the second network packet, the XFRM module can parse the authentication result from the second network packet.

In step 708, if the authentication result indicates that the second network packet has passed message authentication, the XFRM module forwards the second network packet (i.e., the second network packet with the authentication result removed) through a physical network port (for example, the physical network port 0). Or, if the authentication result indicates that the second network packet does not pass message authentication, the XFRM module discards the second network packet, that is, the second network packet will not be forwarded through the physical network port.

Figure 7B:
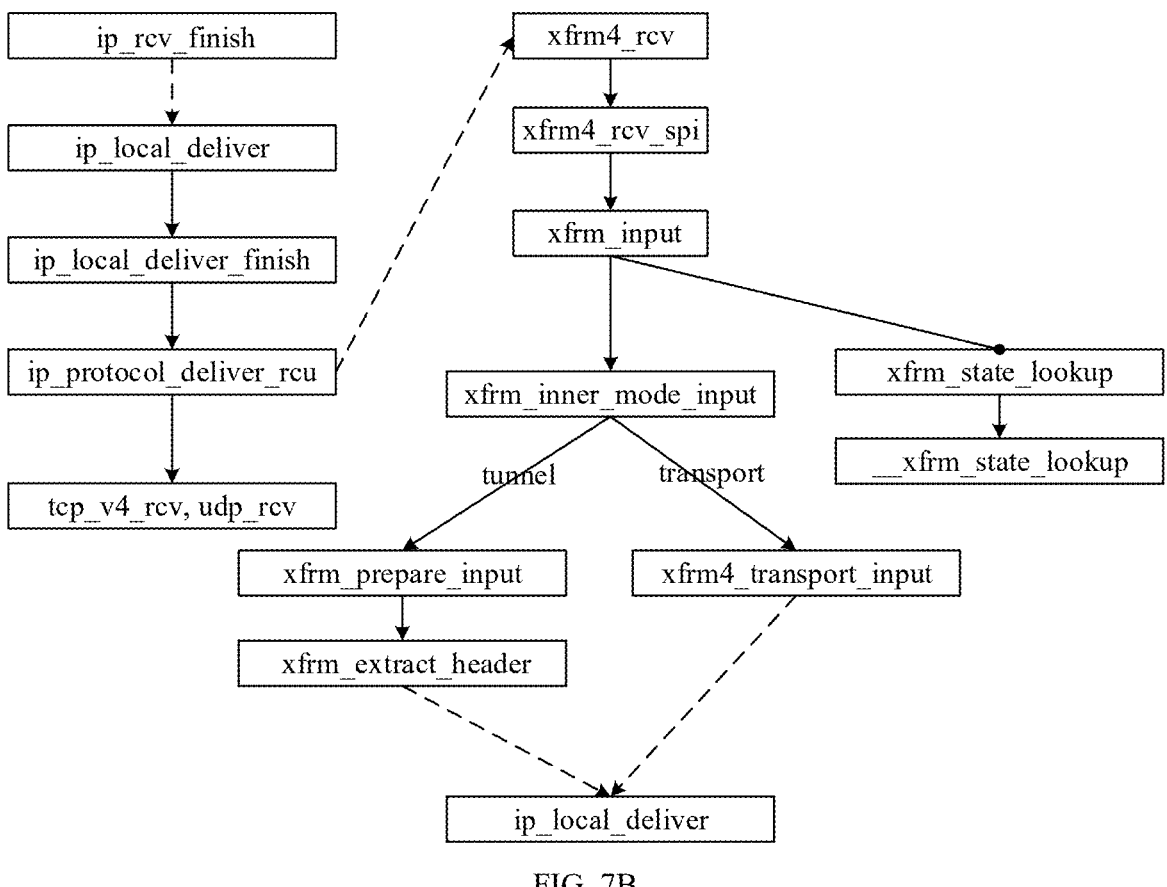
FIG. 7B is a schematic diagram of a processing procedure of an XFRM module according to an example of the present disclosure.

In a possible implementation, the processing procedure of the XFRM module can be shown in FIG. 7B.

After receiving the second network packet, the XFRM module enters an ip_rcv_finish process. In the ip_rcv_finish process, it is necessary to determine whether the second network packet is forwarded or uploaded on a local protocol stack. If it is forwarded, it is necessary to ensure that the second network packet is output from the network device and an address of a next receiving stack. Some IP options also need to be parsed and processed.

An ip_local_deliver process and an ip_local_deliver_finish process are entered, for example, if an IP message (i.e., the second network packet) needs to be sent to a local computer according to a routing result, the ip_local_deliver is called to process the message, that is, the ip_local_deliver is called to send the second network packet to an upper layer protocol. The ip_local_deliver_finish indicates that the second network packet has been processed by the upper layer protocol and a processed second network packet is obtained.

An ip_protocol_deliver_rcu process is entered, in the ip_protocol_deliver_rcu process, an IP protocol number can be used to call an ip_protocol_deliver_rcu function to process data packets.

If the second network packet is an AH network packet or an ESP network packet, an xfrm4_rcv is entered. If the second network packet is not an AH network packet and not an ESP network packet, tcp_v4_rcv and udp_rcv processes are entered. In the tcp_v4_rcv and udp_rcv processes, a transmission control protocol (TCP) or a user datagram protocol (UDP) protocol can be used to forward the second network packet.

In the xfrm4_rcv process, it indicates entering an IPSec packet receiving process, that is, the XFRM module receives the AH network packet or the ESP network packet and starts to process the AH network packet or the ESP network packet.

Then, an xfrm4_rcv_spi process is entered. In the xfrm4_rcv_spi process, the second network packet can be parsed, message identification information, a serial peripheral interface (SPI), a protocol type (for example, AH or ESP, etc.) can be obtained, and SA information can be queried.

Then, an xfrm_input process is entered. In the xfrm_input process, security check, decapsulation, etc. can be performed. The security check refers to expiration check and replay number check on the second network packet. The decapsulation refers to decapsulating the second network packet and removing the authentication result of the second network packet.

Before entering the xfrm_input process, it is also possible to check whether the offload function is enabled. If the offload function is enabled, the authentication result is parsed from the second network packet. If the authentication result indicates that the second network packet has passed message authentication, the xfrm_input process is entered. Otherwise, the second network packet is discarded.

If the offload function is not enabled, the XFRM module needs to perform IPSec protection on the second network packet based on the SA information. In this way, after thexfrm_input process, an xfrm_state_lookup process and an __xfrm_state_lookup process can be entered. In the xfrm_state_lookup process and __xfrm_state_lookup process, the SA information can be queried, and the IPSec protection can be performed on the second network packet based on the SA information.

If the offload function is enabled, after the xfrm_input process, an xfrm_inner_mode_input process is entered. In the xfrm_inner_mode_input process, the XFRM module needs to determine an output mode of the second network packet. The output mode can be a transport mode or a tunnel mode. If the output mode of the second network packet is the transport mode, a forwarding process of the transport mode (corresponding to xfrm4_transport_input) can be executed, and ip_local_deliver can be called to forward the second network packet. If the output mode of the second network packet is the tunnel mode, tunnel information (used to encapsulate a tunnel header for the second network packet, corresponding to xfrm_prepare_input) can be obtained, and then a forwarding process of the tunnel mode (corresponding to xfrm_extract_header, that is, the tunnel header is encapsulated for the second network packet) can be executed, and ip_local_deliver can be called to forward the second network packet. Obviously, after completing the XFRM process, the ip_local_deliver is entered, the inner layer message is exposed and forwarded to the physical network port 0 according to routing rules.

From the above technical solution, it can be seen that in the embodiments of the present disclosure, the IPSec processing procedure is implemented through collaboration of software and hardware, that is, the XFRM module is implemented through software, and the PL hardware module is implemented through hardware. The operations that consume a large amount of resources (the IPSec protection is performed on the network packets based on the SA information) in the IPSec processing procedure are placed in the PL hardware module to complete, and the remaining operations are placed in the XFRM module to complete, thereby reducing processor resources consumed in the process of the IPSec protection (XFRM module uses processor resources), saving resource overhead, and utilizing high-performance calculation of the PL hardware module to reduce the load of the processor resources. By implementing calculation tasks in the PL hardware module and placing tasks such as message format check, anti-replay check, routing in the PS module (XFRM module) that is more suitable for branch processing, the stability of message delay can be improved, and a central processing unit (CPU) load can be reduced by using the high-performance calculation of the PL hardware module. Compatible with the XFRM structure, high-performance secure message processing can be implemented with the XFRM architecture. In the PL hardware module, by splicing the SA information through messages, the process of searching for the SA information is omitted, which can save storage space, reduce processing cycle and improve processing speed. The network card driver is modified based on the offload architecture of the XFRM, and high-performance implementation of the XFRM in the kernel is used to achieve the protocol goals such as anti-replay and security check.

Based on the same application concept as the above method, an embodiment of the present disclosure proposes a network device. The network device includes: an extended framework for routing and management (XFRM) module and a programmable logic (PL) hardware module. The XFRM module is configured to: obtain message identification information and security association (SA) information corresponding to a first network packet, and record a corresponding relationship between the message identification information and the SA information in a first mapping table; and after receiving the first network packet, query the first mapping table through the message identification information of the first network packet to obtain the SA information corresponding to the message identification information, and encapsulate the SA information in the first network packet and send an encapsulated first network packet to the PL hardware module. The PL hardware module is configured to: after receiving the encapsulated first network packet, parse the SA information from the encapsulated first network packet, perform Internet protocol security (IPSec) protection on the first network packet based on the SA information to obtain a secured first network packet, and send the secured first network packet.

In an example, when performing the IPSec protection on the first network packet based on the SA information to obtain the secured first network packet, the PL hardware module is specifically configured to: perform media access control (MAC) parsing on the first network packet to obtain a MAC address and a first inner layer message after the MAC address; perform Internet protocol (IP) parsing on the first inner layer message to obtain an IP address and a second inner layer message after the IP address; if the first network packet is an authentication header (AH) network packet or an encapsulating security payload (ESP) network packet, perform SA parsing on the second inner layer message to obtain the SA information and a payload message after the SA information; if the SA information includes symmetric key information and message authentication code key information, encrypt the payload message with the symmetric key information to obtain a ciphertext payload message, and calculate a message authentication code corresponding to the ciphertext payload message with the message authentication code key information; and splice the ciphertext payload message, the message authentication code, the MAC address, and IP address to obtain the secured first network packet.

In an example, the XFRM module is further configured to send the message identification information and the SA information to the PL hardware module; where the PL hardware module is further configured to record the corresponding relationship between the message identification information and the SA information in a second mapping table. The PL hardware module is further configured to: after receiving a second network packet in response to the first network packet, query the second mapping table through message identification information of the second network packet to obtain the SA information; and perform IPSec protection on the second network packet based on the SA information to obtain a secured second network packet, and send the secured second network packet to the XFRM module; where the XFRM module is further configured to process the received second network packet.

In an example, the XFRM module is further configured to check whether an offload function is enabled; where if the offload function is enabled, it indicates that IPSec protection is disabled, if the offload function is disabled, it indicates that the IPSec protection is enabled; if the offload function is disabled, perform the IPSec protection on the first network packet based on the SA information to obtain a secured first network packet, and send the secured first network packet; if the offload function is enabled, perform the operations of encapsulating the SA information in the first network packet and sending the encapsulated first network packet to the PL hardware module.

In an example, when performing the IPSec protection on the second network packet based on the SA information to obtain the secured second network packet, the PL hardware module is specifically configured to: perform media access control (MAC) parsing on the second network packet to obtain a MAC address and a first inner layer message after the MAC address; perform Internet protocol (IP) parsing on the first inner layer message to obtain an IP address and a second inner layer message after the IP address; if the SA information includes symmetric key information and message authentication code key information, calculate a message authentication code corresponding to the second inner layer message with the message authentication code key information, and determine an authentication result of the second network packet based on the message authentication code; decrypt the second inner layer message with the symmetric key information to obtain a plaintext payload message; and splice the plaintext payload message, the authentication result, the MAC address, and the IP address to obtain the secured second network packet.

In an example, when processing the received second network packet, the XFRM module is specifically configured to: check whether an offload function is enabled; if the offload function is enabled, and the second network packet is an authentication header (AH) network packet or an encapsulating security payload (ESP) network packet, parse the authentication result from the received second network packet; where the authentication result indicates that the second network packet passes message authentication or the second network packet does not pass the message authentication; if the authentication result indicates that the second network packet passes the message authentication, forward the second network packet through a physical network port; or, if the authentication result indicates that the second network packet does not pass the message authentication, discard the second network packet.

In an example, if the SA information is newly added SA information for the message identification information, the XFRM module is further configured to: send a state add command to the PL hardware module, where the state add command carries the message identification information and the newly added SA information; where the PL hardware module is further configured to: record the corresponding relationship between the message identification information and the newly added SA information in the second mapping table based on the state add command; or, if the SA information is updated SA information for the message identification information, the XFRM module is further configured to: send a state delete command and a state add command to the PL hardware module, where the state delete command carries the message identification information, and the state add command carries the message identification information and the updated SA information; where the PL hardware module is further configured to: delete the corresponding relationship between the message identification information and the SA information from the second mapping table based on the state delete command, and record a corresponding relationship between the message identification information and newly added SA information in the second mapping table based on the state add command.

Figure 8:
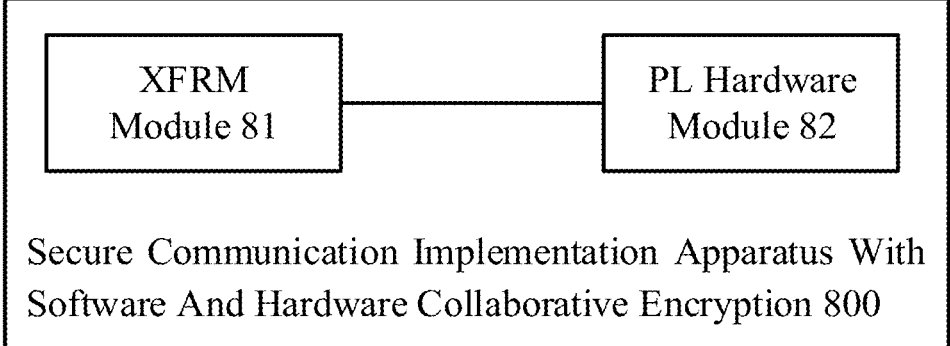
FIG. 8 is a schematic structural diagram of a secure communication implementation apparatus with software and hardware collaborative encryption according to an example of the present disclosure.

Based on the same application concept as the above method, an embodiment of the present disclosure proposes a secure communication implementation apparatus with software and hardware collaborative encryption. As shown in FIG. 8, which is a schematic structural diagram of the apparatus, the apparatus includes an XFRM module 81 and a PL hardware module 82.

The XFRM module 81 is configured to: obtain message identification information and SA information corresponding to a first network packet, and record a corresponding relationship between the message identification information and the SA information in a first mapping table.

The XFRM module 81 is further configured to: after receiving the first network packet, query the first mapping table through the message identification information of the first network packet to obtain the SA information corresponding to the message identification information, and encapsulate the SA information in the first network packet and send an encapsulated first network packet to the PL hardware module.

The PL hardware module 82 is configured to: after receiving the encapsulated first network packet, parse the SA information from the encapsulated first network packet, perform IPSec protection on the first network packet based on the SA information to obtain a secured first network packet, and send the secured first network packet.

In an example, when performing the IPSec protection on the first network packet based on the SA information to obtain the secured first network packet, the PL hardware module 82 is specifically configured to: perform MAC parsing on the first network packet to obtain a MAC address and a first inner layer message after the MAC address; perform IP parsing on the first inner layer message to obtain an IP address and a second inner layer message after the IP address; if the first network packet is an AH network packet or an ESP network packet, perform SA parsing on the second inner layer message to obtain the SA information and a payload message after the SA information; if the SA information includes symmetric key information and message authentication code key information, encrypt the payload message with the symmetric key information to obtain a ciphertext payload message, and calculate a message authentication code corresponding to the ciphertext payload message with the message authentication code key information; and splice the ciphertext payload message, the message authentication code, the MAC address, and IP address to obtain the secured first network packet.

In an example, the XFRM module 81 is further configured to send the message identification information and the SA information to the PL hardware module; where the PL hardware module 82 is further configured to record the corresponding relationship between the message identification information and the SA information in a second mapping table; after receiving a second network packet in response to the first network packet, query the second mapping table through message identification information of the second network packet to obtain the SA information; and perform IPSec protection on the second network packet based on the SA information to obtain a secured second network packet, and send the secured second network packet to the XFRM module; where the XFRM module 81 is further configured to process the received second network packet.

Figure 9:
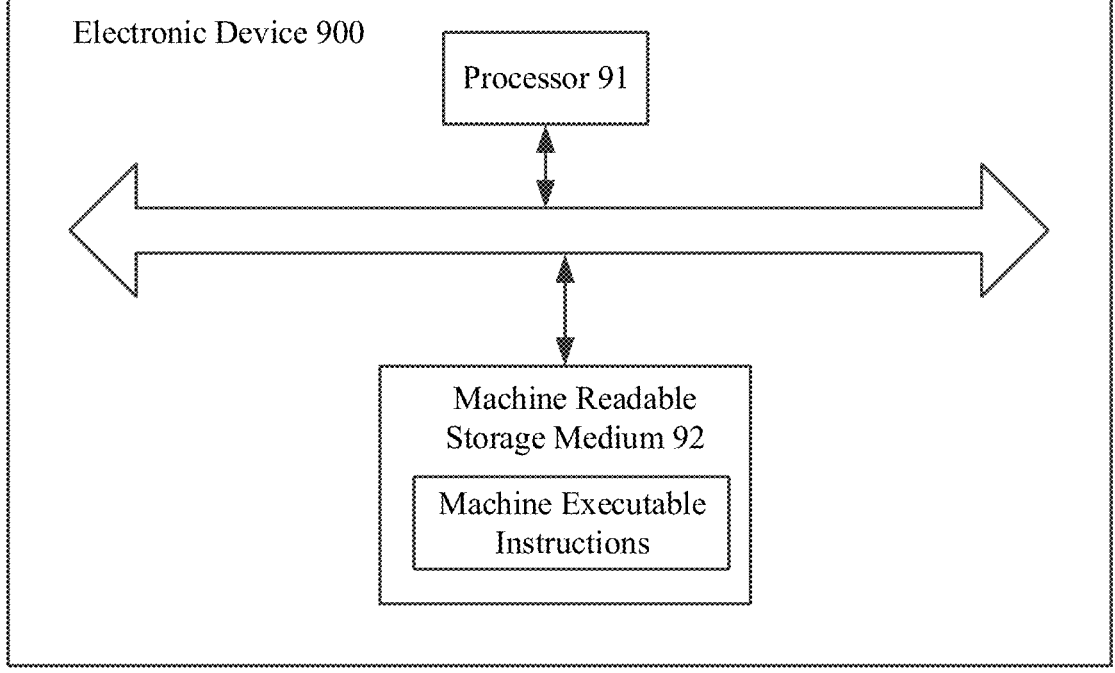
FIG. 9 is a hardware structure diagram of an electronic device according to an example of the present disclosure.

Based on the same application concept as the above method, an embodiment of the present disclosure proposes an electronic device. As shown in FIG. 9, the electronic device 900 includes one or more processors 91 and a machine readable storage medium 92. The machine readable storage medium 92 stores machine executable instructions that can be executed by the one or more processors 91. The one or more processors are configured to execute the machine executable instructions to implement the secure communication implementation method with software and hardware collaborative encryption in the above examples of the present disclosure.

Based on the same application concept as the above method, an embodiment of the present disclosure also proposes a machine readable storage medium, which stores several computer instructions. When the computer instructions are executed by a processor, the secure communication implementation method with software and hardware collaborative encryption in the above examples of the present disclosure can be implemented.

The above machine readable storage medium can be any electronic, magnetic, optical or other physical storage device, which can contain or store information such as executable instructions, data, etc. For example, the machine readable storage medium can be a random access memory (RAM), a volatile memory, a non-volatile memory, a flash memory, a storage drive (such as a hard disk drive), a solid-state drive, any type of storage disk (such as an optical disk, a dvd), or a similar storage medium, or a combination thereof.

Based on the same application concept as the above method, an embodiment of the present disclosure also proposes a computer program product, including a computer program that, when executed by a processor, implements the secure communication implementation method with software and hardware collaborative encryption in the above examples of the present disclosure.

Those skilled in the art should understand that the embodiments of the present disclosure can be provided as methods, systems, or computer program products. Therefore, the present disclosure may take the form of a fully hardware implementation, a fully software implementation, or a combination of software and hardware implementation. Moreover, the embodiments of the present disclosure may take the form of a computer program product implemented on one or more computer usable storage media (including but not limited to disk storage, CD-ROM, optical storage, etc.) containing computer usable program code.

The above are only examples of the present disclosure and are not intended to limit the present disclosure. For those skilled in the art, the present disclosure may have various modifications and variations. Any modifications, equivalent substitutions, improvements, etc. made within the spirit and principles of the present disclosure shall be included within the scope of the claims of the present disclosure.

The invention claimed is:

1. A secure communication implementation method with software and hardware collaborative encryption, applied to a network device, wherein the network device comprises an extended framework for routing and management (XFRM) module and a programmable logic (PL) hardware module, the method comprising:

obtaining, by the XFRM module, message identification information and security association (SA) information corresponding to a first network packet, and recording a corresponding relationship between the message identification information and the SA information in a first mapping table; sending, by the XFRM module, the message identification information and the SA information to the PL hardware module; wherein the PL hardware module records the corresponding relationship between the message identification information and the SA information in a second mapping table;

after receiving the first network packet, querying, by the XFRM module, the first mapping table through the message identification information of the first network packet to obtain the SA information corresponding to the message identification information;

encapsulating, by the XFRM module, the SA information in the first network packet and sending an encapsulated first network packet to the PL hardware module; and after receiving the encapsulated first network packet, parsing, by the PL hardware module, the SA information from the encapsulated first network packet, performing Internet protocol security (IPSec) protection on the first network packet based on the SA information to obtain a secured first network packet, and sending the secured first network packet, wherein after querying, by the XFRM module, the first mapping table through the message identification information of the first network packet to obtain the SA information corresponding to the message identification information, the method further comprises:

checking, by the XFRM module, whether an offload function is enabled, wherein, if the offload function is enabled, it indicates that the IP Sec protection is disabled, and if the offload function is disabled, it indicates that the IPSec protection is enabled;

if the offload function is disabled, performing, by the XFRM module, the IPSec protection on the first network packet based on the SA information to obtain the secured first network packet, and sending the secured first network packet;

if the offload function is enabled, performing, by the XFRM module, operations of encapsulating the SA information in the first network packet and sending the encapsulated first network packet to the PL hardware module.

2. The method according to claim 1, wherein performing, by the PL hardware module, the IPSec protection on the first network packet based on the SA information to obtain the secured first network packet comprises:

performing, by the PL hardware module, media access control (MAC) parsing on the first network packet to obtain a MAC address and a first inner layer message after the MAC address; performing, by the PL hardware module, Internet protocol (IP) parsing on the first inner layer message to obtain an IP address and a second inner layer message after the IP address;

if the first network packet is an authentication header (AH) network packet or an encapsulating security payload (ESP) network packet, performing, by the PL hardware module, SA parsing on the second inner layer message to obtain the SA information and a payload message after the SA information;

if the SA information comprises symmetric key information and message authentication code key information, encrypting, by the PL hardware module, the payload message with the symmetric key information to obtain a ciphertext payload message, and calculating a message authentication code corresponding to the ciphertext payload message with the message authentication code key information; and splicing, by the PL hardware module, the ciphertext payload message, the message authentication code, the MAC address, and the IP address to obtain the secured first network packet.

3. The method according to claim 1, wherein after sending, by the PL hardware module, the secured first network packet, the method further comprises:

after receiving a second network packet in response to the first network packet, querying, by the PL hardware module, the second mapping table through message identification information of the second network packet to obtain the SA information; and performing, by the PL hardware module, IPSec protection on the second network packet based on the SA information to obtain a secured second network packet, and sending the secured second network packet to the XFRM module so that the XFRM module processes the received second network packet.

4. The method according to claim 3, wherein performing, by the PL hardware module, the IPSec protection on the second network packet based on the SA information to obtain the secured second network packet comprises:

performing, by the PL hardware module, media access control (MAC) parsing on the second network packet to obtain a MAC address and a first inner layer message after the MAC address; performing, by the PL hardware module, Internet protocol (IP) parsing on the first inner layer message to obtain an IP address and a second inner layer message after the IP address;

if the SA information comprises symmetric key information and message authentication code key information, calculating, by the PL hardware module, a message authentication code corresponding to the second inner layer message with the message authentication code key information, and determining an authentication result of the second network packet based on the message authentication code; decrypting, by the PL hardware module, the second inner layer message with the symmetric key information to obtain a plaintext payload message;

splicing, by the PL hardware module, the plaintext payload message, the authentication result, the MAC address, and the IP address to obtain the secured second network packet.

5. The method according to claim 4, wherein the XFRM module processes the received second network packet, comprises:

checking, by the XFRM module, whether the offload function is enabled;

if the offload function is enabled, and the second network packet is an authentication header (AH) network packet or an encapsulating security payload (ESP) network packet, parsing, by the XFRM module, the authentication result from the received second network packet; wherein the authentication result indicates that the second network packet passes message authentication or the second network packet does not pass the message authentication;

if the authentication result indicates that the second network packet passes the message authentication, forwarding, by the XFRM module, the second network packet through a physical network port; or, if the authentication result indicates that the second network packet does not pass the message authentication, discarding, by the XFRM module, the second network packet.

6. The method according to claim 1, wherein sending, by the XFRM module, the message identification information and the SA information to the PL hardware module, wherein the PL hardware module records the corresponding relationship between the message identification information and the SA information in the second mapping table, comprises:

if the SA information is newly added SA information for the message identification information, sending, by the XFRM module, a state add command to the PL hardware module, wherein the state add command carries the message identification information and the newly added SA information; wherein the PL hardware module records the corresponding relationship between the message identification information and the newly added SA information in the second mapping table based on the state add command; or, if the SA information is updated SA information for the message identification information, sending, by the XFRM module, a state delete command and a state add command to the PL hardware module, wherein the state delete command carries the message identification information, and the state add command carries the message identification information and the updated SA information; wherein the PL hardware module deletes the corresponding relationship between the message identification information and the SA information from the second mapping table based on the state delete command, and records a corresponding relationship between the message identification information and the newly added SA information in the second mapping table based on the state add command.

7. A network device, comprising:

an extended framework for routing and management (XFRM) module, configured to:

obtain message identification information and security association (SA) information corresponding to a first network packet, record a corresponding relationship between the message identification information and the SA information in a first mapping table, and send the message identification information and the SA information to a programmable logic (PL) hardware module; wherein the PL hardware module is configured to record the corresponding relationship between the message identification information and the SA information in a second mapping table; and after receiving the first network packet, query the first mapping table through the message identification information of the first network packet to obtain the SA information corresponding to the message identification information, and encapsulate the SA information in the first network packet and send an encapsulated first network packet to the PL hardware module;

the PL hardware module, configured to:

after receiving the encapsulated first network packet, parse the SA information from the encapsulated first network packet, perform Internet protocol security (IPSec) protection on the first network packet based on the SA information to obtain a secured first network packet, and send the secured first network packet;

wherein after querying the first mapping table through the message identification information of the first network packet to obtain the SA information corresponding to the message identification information, the XFRM module is further configured to:

check whether an offload function is enabled, wherein, if the offload function is enabled, it indicates that the IPSec protection is disabled, and if the offload function is disabled, it indicates that the IPSec protection is enabled;

if the offload function is disabled, perform the IP Sec protection on the first network packet based on the SA information to obtain the secured first network packet, and send the secured first network packet;

if the offload function is enabled, perform operations of encapsulating the SA information in the first network packet and sending the encapsulated first network packet to the PL hardware module.

8. The network device according to claim 7, wherein when performing the IP Sec protection on the first network packet based on the SA information to obtain the secured first network packet, the PL hardware module is configured to:

perform media access control (MAC) parsing on the first network packet to obtain a MAC address and a first inner layer message after the MAC address; perform Internet protocol (IP) parsing on the first inner layer message to obtain an IP address and a second inner layer message after the IP address;

if the first network packet is an authentication header (AH) network packet or an encapsulating security payload (ESP) network packet, perform SA parsing on the second inner layer message to obtain the SA information and a payload message after the SA information; if the SA information comprises symmetric key information and message authentication code key information, encrypt the payload message with the symmetric key information to obtain a ciphertext payload message, and calculate a message authentication code corresponding to the ciphertext payload message with the message authentication code key information; and splice the ciphertext payload message, the message authentication code, the MAC address, and IP address to obtain the secured first network packet.

9. The network device according to claim 7, wherein the PL hardware module is further configured to:

after receiving a second network packet in response to the first network packet, query the second mapping table through message identification information of the second network packet to obtain the SA information; and perform IPSec protection on the second network packet based on the SA information to obtain a secured second network packet, and send the secured second network packet to the XFRM module;

wherein the XFRM module is further configured to process the received second network packet.

* * * * *